(12) United States Patent
Xu

(10) Patent No.: US 7,373,481 B2
(45) Date of Patent: May 13, 2008

(54) DISTRIBUTED-STRUCTURE-BASED PARALLEL MODULE STRUCTURE AND PARALLEL PROCESSING METHOD

(76) Inventor: Zhaochang Xu, #1211/9 West Beijing Road, Shanghai (CN) 200040

( * ) Notice: Subject to any disclaimer, the term of this patent is extended or adjusted under 35 U.S.C. 154(b) by 604 days.

(21) Appl. No.: 10/333,618

(22) PCT Filed: Jul. 18, 2001

(86) PCT No.: PCT/CN01/01179

§ 371 (c)(1),
(2), (4) Date: Aug. 15, 2003

(87) PCT Pub. No.: WO02/15028

PCT Pub. Date: Feb. 21, 2002

(65) Prior Publication Data

US 2004/0044879 A1    Mar. 4, 2004

(30) Foreign Application Priority Data

Jul. 18, 2000   (CN) ............................ 00 1 19472

(51) Int. Cl.
*G06F 15/00* (2006.01)
*G06F 15/76* (2006.01)

(52) U.S. Cl. .............. 712/25; 712/225; 712/231; 712/23; 712/36
(58) Field of Classification Search .............. 712/25, 712/32, 37, 235
See application file for complete search history.

(56) References Cited

U.S. PATENT DOCUMENTS

| | | | | |
|---|---|---|---|---|
| 4,809,159 A | * | 2/1989 | Sowa | ............ 712/25 |
| 4,953,082 A | * | 8/1990 | Nomura et al. | ............ 712/25 |
| 5,021,947 A | * | 6/1991 | Campbell et al. | ............ 712/25 |
| 5,657,465 A | * | 8/1997 | Davidson et al. | ............ 712/201 |

* cited by examiner

*Primary Examiner*—Niketa Patel
*Assistant Examiner*—Jesse Moll
(74) *Attorney, Agent, or Firm*—The Maxham Firm

(57) ABSTRACT

A Distributed-Structure-based parallel module structure and parallel processing method. One object is to provide a novel sequence-net computer architecture. A parallel operating structure with N+1 independent flow-sequences is created, and the N+1 flow-sequences control independently the distributed token via the sequence-net instructions to realize the parallel operating of module. Wherein N flow-sequences is regular type, a new consistency flow-sequence Sc running independently is composed by consistency tokens. The distributed token connecting among multi-machines support the co-operation running among N+1 flow-sequences.

15 Claims, 8 Drawing Sheets

Fig.1C Turing machine (Prior Art)

RMD instruction

Parameters of RMD

| Address | Data | Read |
|---|---|---|

Address indicate to DT

Transformation/execution Parameters by DTCD-P

1. Data part

| Address | Data | Read |
|---|---|---|

2. Token part

| Address | Token | Read |
|---|---|---|

Destination token*

\* Operation of destination token: test token -> processing of interruption program

Fig.3G

WMD instruction

Parameters of WMD

| Address | Data | Write |
|---|---|---|

Address indicate DT array

Transformation/execution Parameters by DTCD-P

1. Data part

| Address | Data | Write |
|---|---|---|

2. Token part

| Address | Token=1 | Write |
|---|---|---|

Source token*

\* Operation of Source token: Token←1

Fig.3H

DCO instruction

Parameters of DCO

| Address |
|---|

Explicit source

Transformation/execution Parameters by DTCD-X

1. First step

| Address | read data | Test Token* |
|---|---|---|

- Result of test token: 1=source of consistency operation;
  0=destination of consistency operation.

2. Second step

-For the case of source Of Consistence operation

Send data token to DT

-For the case of destination of consistency operation

| Address | Write data | Test T bus* |
|---|---|---|

Read data token from DT

\* Result of test token from T bus: determination of valid/repeat for consistency operation.

Fig.3I

Expansion of consistency instruction

- Macro instruction of batch processing for address

The initial address, length, and source type are used as the parameters of macro-instruction The parameters of consistency macro instruction

| Address | length | Explicit source type |
|---|---|---|

- Condition for explicit source type

The condition between address and machine number is used as a source.
The condition between length and machine number is used as a source.
The machine number designated by program is used as a source.
The plurality source permission is used as the source.
The particular relation of function is used as a source.

- Type of consistency instruction without token test in transmission.

Fig.5

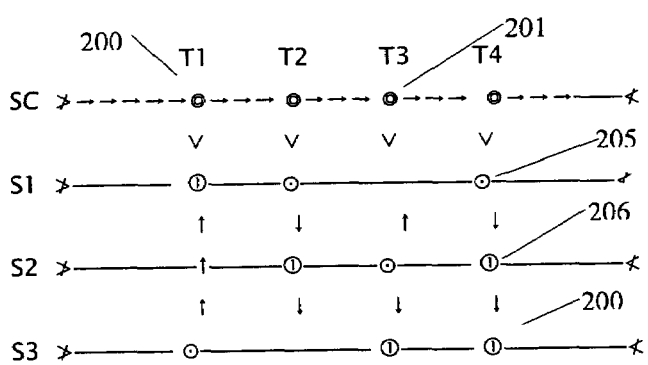

DISTRIBUTED-STRUCTURE-BASED PARALLEL MODULE STRUCTURE AND PARALLEL PROCESSING METHOD

BACKGROUND

1. Field of Invention

This invention relates to a distributed structure and a parallel processing technology in computer technology and, in particular, to a distributed-structure-based parallel module structure and parallel processing method.

2. Discussion of Related Art

Since the last 30 years, the research funds and qualified people have been heavily investing in the fields of distributed structure and parallel processing of computer. However many key problems still haven not been solved.

The expected target of the computer structure research is the industrialization. It is particularly true with respect to the achievements obtained in the single CPU computer field owing to its industrialization. For this target, the generality of parallel computer system is far more important than its speed. Toward the generality, many wide gaps can not get through so far.

Although there are many difficulties, works are continued. Today, the research of distributed system still aims at the distributed operating system, and the parallel processing schemes have been focused on three types of structure: symmetric multiprocessor (MP), massively parallel processing system (MPP), and network of workstations (NOW).

FIG. 1A is a schematic diagram of shared memory structure in previous art.

In previous art, the hardware layer of MP enters to a shared-memory-oriented structure. Therefore, from the point of view of programming, it is the common abstraction capability of MP that a plurality of processors 100 shown in FIG. 1A are connected to a shared memory 102 through an internal connection network 101 having various structures, wherein the shared memory 102 may be distributed or centralized in structure.

The advantage of shared memory allows each processor to access shared memory directly by the instructions of single processor. The recent trend of development is the implementation of unified addressing for distributed memory so that the read/write operation in different time, known as non-uniform memory access (NUMA), will be effected.

In a data-sharing model, it is the advantage of instruction direct access that there is no distributed memory structure parameters appearing in programming. However, the data-sharing model does not provide the principle of modeling in a MP hardware environment for user, and also does not provide a direct solution for program synchronization of N processors in general distributed computing.

FIG. 1B is a schematic diagram of network of workstation (NOW) structure.

A plurality of computers in distributed structure are connected by a communication interface. It is their common capability in configuration that a plurality of program flows 103 are connected in a form defined by communication mode 104 respectively, and connected by the communication program control in program flow 103. They have the advantage of distributed structure, but there is still a difficulty of modeling by user.

Regardless of data sharing or massage passing, the multi-machine system is also in difficulty with its data processing and synchronization between a plurality of program flows 100 (or 103). The structures shown in FIG. 1A and FIG. 1B can not work out a solution to the problems of synchronization and modeling at hardware layer. In fact, a common understanding on the key of difficulty in distributed system and parallel processing is not achieved up to now. Some viewpoint considers that the difficulties of distributed system are the real-time ability and the schedulability, and the difficulties of parallel processing are the parallel programming and parallel compiling. However, the parallel processing and parallel compiling are also problems to the distributed system, and the real-time ability and schedulablity are also needed in the parallel processing. The generality, which is the most important problem, is still a research target for distant future without any courage to face it today.

Similarly to the viewpoint of some experts, the inventor considers that "the previous research on parallel processing does not expose the main contradiction (or enter to the real nucleus of problem)", and the corresponding works should be taken.

Summarizing the previous arts shown in FIG. 1A and FIG. 1B, on the promise of multi-machine architecture, the parallel processing must be characterized by two features as follows:

(1) The control of system running must be a plurality of independent asynchronous-programs; and (2) The data must be transferred in real-time among a plurality of programs when N distributed programs are performed in parallel (these data are known as data in parallel module or "modular data" for brief).

According to the features described, at least 3 problems must be tackled for implementing a proper model operation and programmability in parallel processing as follows:

(1) the determination of validation has to be made before using a modular data transferred for the program flow;

(2) the configuration parameters should be generated in a hardware transmission path between processors for the data, but they are not the parameters of application model and could not appear in the programming interface; and (3) In the system operation, not only the synchronization of programs should be implemented, but also the dead lock must be prevented.

Only the three problems described above have a solution, the discussion on parallel processing efficiency (that is, speed) can be tackled.

For decades of years, these three problems (referred briefly to as "3* problem" below) is are obvious, and easy to analysis. However, an optimum scheme for total solution of 3* problem is still not suggested.

The 3* problems is are caused by the fact that the control interface for N programs and a naked-processor comprised of "N independent programs+interconnection structure for multi-machine" are provided by almost all hardware. This interface is substantially intended to tackle the multi-machine problem in the field of Turing machine.

A basic configuration of Turing machine comprising a Turing machine tape (named state tape below) and a read-write head is shown in FIG. 1C.

The Turing machine aims at a state processing, and definitions including "step-by-step", "left shift or right shift", "contents of process state square", etc. Only are provided to the read-write head and the acceptance from reader is required. Based on the concept of process "state tape" of Turing machine in previous art, the "algorithm" discipline is developed with a great contribution to the advance of computer technology. Thus, part of the functions in read-write head such as the moving way shall belong to the algorithm naturally.

The Turing machine is a very important abstraction model in computer science with a clear description of "state element" in computer science and engineering. However, it was only a product in computer budding period without the problems of multi-machine architecture. Its limitation appears when it enters to a multi-machine environment (distributed and parallel processing).

The feature of "N independent programs+interconnection structure between processor" is corresponding to one state tape shared by a plurality of read-write heads, and not departs from the field of Turing machine. The invention recognizes that from the view point of multi-program, the effect eventually corresponds to "one state tape shared by a plurality of read-write heads", no matter it is a shared memory or a massive passing in previous art.

In some previous arts, it is expected that the synchronization of read-write head can be coordinated by the determination of state-tape information so that the 3* problem can be resolved. The invention recognizes that 3* problem is really a problem, but it is neither a total problem, nor a nucleus of problem. The deeper layer problem is unable to describe and summarize by the Turing machine, and a breakthrough is necessary to make for the Turing machine limitation and the interface of "N programs+interconnection structure between processors" resulted from hardware structure. The invention recognizes that it is necessary to reconsider the problems in a wider range and a deeper layer and to introduce another element for computer science and engineering.

To simplify the description of a new computer element related to the invention, some new concepts and discoveries will introduced herein.

Firstly, the concepts of "flow" and "sequence" will be introduced. A flow represents a dynamic and serial independent-driving configuration, and a sequence represents a static order, generally, a flow results from the hardware structure, and a sequence result from the model analysis. Based on this definition, a computer structure can be abstracted into a flow structure and the Petri-network (it implicates a state description) and the likes are recognized as representation in sequence aspect. The match between a flow and a sequence (may be referred to as a flow-sequence) indicates that a sequence is allowed to load on a flow, and the flow-sequence is running in accordance with the sequence loaded under a driving of the flow. The computer program, in fact, is the result of match with 'flow' and 'sequence', that is, it is represented with instruction, and also is a flow-sequence with high controllable capability at hardware layer (not all the flow-sequences can be converted into a program).

A flow, a sequence and a match between them are three concepts. The previous various concepts in computer field are developed on the basis of the matching with 'flow' and 'sequence'.

Because the basic thoughts of the invention is a match from 'sequence layer' (representing model) for structure and from 'flow layer' (representing structure) for model and after the two matching, the invention discover sequence-net, which can match for both flow layer and sequence layer. Therefore, it will be happened that a same structure and relative symbol (for example, Sc and Si) indicates the sequence of a model in the model environment (without the flow concept of computer structure), but indicates a flow in the computer structure environment (without the sequence concept of model), and indicates flow-sequence (in the flow-sequence matching state) in the application environment. In this specification text, it seems that there is confusion in the symbol of Sc, Si and the likes. But it is feature that this invention owns, and it is necessary for describing the thoughts of the invention. So that in the sequence-net computer description, it should be the flow-sequence state which combines flow with sequence.

When a model can be implemented in a single processor, the algorithm will be solvable. However, the same model may be unable to implement in multi-machine, but it can not be recognized that the algorithm is unable to solve for this reason. Therefore, the relation between model and computer structure is not dependent on the algorithm. In this invention, an "adaptability" is introduced to represent the relation between model and computer structure. A well solution of adaptability means the achievement of generality of computer structure. Thus, the adaptability is the key target of research for industrialization.

Two fundamental laws discovered in the research of flow and sequence aimed at adaptability is incorporated directly herein.

(1) An N sequences parallel-processing model comprises N+1 or more sequences in fact, wherein the N+1st sequence is an global sequence.

(2) A flow from the structure is required to match each sequence from the model respectively for forming a flow-sequence, that is, the flow-sequence pairing law.

Furthermore, an inference can be drawn in below:

N+1 sequences can be combined into one sequence (thus, a flow-sequence pairing in single processor is formed).

The laws and inference show the relation steps as follows:

The first step of adaptability research is the permission of modeling. The algorithm research can be entered only after the permission of modeling. According to the concepts of flow and sequence, the match between flow and sequence is the premise of the permission of modeling. Therefore, the quality of a match between flow and sequence is one of the key factors affected the adaptability.

In addition, they show that there are differences between the single-processor and the multi-machine in research environment as follows:

The single-processor has a natural match between flow and sequence, and enters to the algorithm research with the match condition. On the other hand, the distributed and parallel processing enters to the algorithm research without a sufficient match condition.

From the research described above, a fully new viewpoint emerged: there are two elements, "flow-sequence" and "state", in the computer science.

The "state" element is familiarized through the Turing machine. Ever since the beginning of computer, the state element has been a very important factor. The most abstract and succinct summarization is made for the state element by the Turing machine. The research of state element is deepened by the algorithm for the purpose of running a model in a computer. In fact, the computer background for state element research is the single-processor structure due to its natural match property.

For the "flow-sequence", although it is not familiarized in its form, it has been perceived by anyone in the art without an expression of it only. In the definition of read-write head in the Turing machine, pair of matching flow-sequences is implicated to represent the feature of single-processor structure. However, for the separation of flow-sequence, the implementation of sequence description, and the deepening of sequence research, the Turing machine is powerless, and a creative research approach and description method is required.

The invention recognizes that the flow-sequence is an independent layer in a computer architecture, and the "flow-sequence element" is same important as that of state element. The research of flow-sequence element will be described by sequence-net below, and one of the research targets is the adaptability between model and computer structure. The invention, as the first research on flow-sequence element, yields an entirely new result. In the previous art, the flow-sequence element is in a state of necessity realm (an objective law necessary to obey although without consciousness) all the time. Thus in the operational application example of parallel processing, it is inevitable to comprise a matching process for flow-sequence element unconsciously (but can not yield a good result).

The invention recognizes that all the previous theories can not allow the "flow and sequence" element to display it talent, and a reconstruction of a layer and method capable of the problem description is required. The invention will start from a most general flow chart.

An abstraction of a typical parallel processing flow chart is shown in FIG. 1D.

This is a structure representation abstracted from a flowchart often appearing on a desk or a workshop wall. In FIG. 1D, the interconnection relation between flow steps is indicated by token mode, and it is taken as a typical parallel module and description method in the invention. According to the invention, the flowchart shows a plurality of parallel sequences and the relation among then in a model and a flow in the flowchart is referred to as a sequence. The flowchart comprises three sequences S1-S3 and four sets of combined token 108. Sequence Si (i=1, 2, 3) (the specific numbers of index I are omitted in below description) are three independent sequences, and the interconnection functions among them are indicated by the combined tokens T1, T2, T3 and T4. The combined token 108 consists of a plurality of tokens including a source token 105 and a destination token 106 ① both inserted into the corresponding positions in each sequence Si respectively. Among the sequences, the token transmission path structures 109 are required by the combined token 108.

The parallel run of three sequences are functioned as follows:

A source token value=1 (Valid) is generated when a sequence Si passes a source token 105. The value (=1) of source token 105 is sent to a destination token 106. A test token value is required when a sequence Si passes a destination token. If the tested token value=0 (invalid), the sequence Si will be waiting; if the test token value=1 (valid), the running of sequence Si will continue.

For a model, the run coordination process of several sequences Si described above is very clear for human understanding without any question. In fact, it is the original form of parallel module in previous art even though it is not defined clearly.

The sequence Ms of a module that exists in the interconnection of sequences Si is shown in FIG. 1E.

Based on the component feature of sequence Si and token, a set of directional line can be found in FIG. 1D. They are running zigzag from left to right through the sequences and the combined tokens 108 by branching and passing to indicate the running order among sequence, and are referred to as the sequence of (parallel) module Ms 110 as shown in FIG. 1E.

It is obviously that there are two different parameters in a Ms. The one is an arrow line overlapping with each sequence Si in horizontal direction to represent the sequence of combined token 108 during running. The another one is an arrow line overlapping with internal transmission path structure in vertical direction, and is generated by the multi-machine structure. The key intention of Ms is the sequence of combined token, and the Ms is independent of each Si, however, in a distributed structure environment, the Ms is superimposed sectionally on these Sis, and implemented by the token transfer so that a large amount of structure parameters are mixed into the Ms.

The sequence of module Ms is an global sequence with distribution property in sequence structure. The global property refers to an autonomous sequence defined by the interconnection relation of N sequences Si. The distribution property refers to the distribution of Ms among each Si and its transfer relation among each Si. Thus, the sequences contained in an Ms can not separated from each Si, and also affects the structure of each Si.

The sequence Ms 110 indicates the character of internal sequences of a parallel module. In FIG. 1D, it shows that there is one (at least) global sequence Ms 110 in addition to N (N=3 in here) local sequences. Therefore, One of the basic character of a parallel module is the possession of N+1 sequences (at least) (may be equivalent to N+2, N+3 ... sequences).

It is also an understanding result from the flowchart by a viewpoint of computer structure that there are N+1 sequences in a parallel module. Thus, there is a misconception, which is neglected very easily, between such result and the intelligent understanding of human brain limited on FIG. 1D. The model's sequence Ms is neglected in previous art due to the misconception. At the same time, a huge amount of data structures and synchronization parameters are increased in the control due to the interconnection of multi-machine structure, known as the information explosion, and the requirement for eliminating them is very hard to realize in previous art. Although the increment of structure parameter is eliminated, the Ms described above will be removed at the same time for the misconception. However, the elimination of Ms is not allowed since it is a model parameter and not the proliferating parameters from a multi-machine structure. How to input the model parameter Ms? This is not only the actual target for computer architecture research in previous art, but also a main source to cause all the problems. Furthermore, it is a start point the invention departs from the previous art.

After the description of FIGS. 1A-FIG. 1E, the points of previous art will be more apparent by observing and explaining it again from a new viewpoint.

The existence of Ms is neglected in previous art.

In the previous parallel processing technology, the efforts are only made toward the structure without the research of a general character over the span across model and computer structure. The distinction of various architectures is the differences in hardware interconnection structure, but they are consistency in neglecting Ms and attempting parallel running control with N independent programs. Therefore, from a standpoint of the invention, the common problem in previous art belongs to a same type that the multi-machine problems are solved by the concept of Turing machine. There are N+1 sequences in a model in fact, and N independent sequences can only be supported by the structure of N computers. Thus, the problem that who can support the N+1st global sequence Ms occurs. Naturally, one may associate such problem with the basic concept "N+1 unknown numbers can not be solved by N equations" in the high school algebra.

The invention recognizes that this is the problem for previous art in thinking.

In the description of the 3* problem originated from the structure research, the problem of N+1st global sequence is not referred. In the previous art, the synchronization only relates to N programs as a traditional understanding in previous art, and the N+1st sequence factor is not taken into account. Obviously, the concept of 3* problem in previous art is error since the key problem, the match between flow and sequence, is neglected, and the object effect of multi-machine synchronization is the implementation of the sequence of Ms.

The reasons for the limitation appearing in the Turing machine faced with the distributed and parallel processing will be described in below:

In the structure defined by Turing machine, the match between one flow and one sequence is complete, and the flow is combined with sequence. Therefore, the Turing machine can not work as a base for the research of flow-sequence element since it represents the state element abstractly in the condition of the accomplishment of a match between flow and sequence.

The reasons for the possession of a match between flow and sequence in a single-processor will be described:

N+1 sequences (N local sequences and 1 global sequence) in a model can be combine into one sequence to support a match between flow and sequence in a single-processor.

In a single-processor, the parallel module shown in FIG. 1D corresponds to a multi-process. In the environment of single-processor, the sequence Ms 110 of a module existed in fact is converted into "a serial sequence generated and arranged in time order", and each sequence Si is divided into small blocks respectively. Then each small blocks is arranged to meet the requirement of Ms and N number of Si at the same time, and a serial sequence consistent with original N+1 sequences is generated. After the accomplishment of the combination of a plurality of sequences into one sequence, the match with a flow comprised in the single-processor structure in performed. The match is complete at the hardware layer already, thus the single processor is capable of modeling at the hardware layer.

Furthermore, in a single-processor, The environment of 3* problem is changed greatly. The "shared memory" in multi-machine is replaced by the instruction-addressing memory in a single-processor. Each flow-sequence Si is converted into the multi-process in a single-processor without the structure parameters in the access data from the memory, and the data transmission among Sis is converted into a "read after be written" order for a same memory address. Therefore, in the single-processor structure, the token structure shown in FIG. 1D and FIG. 1E disappears, and the sequence element is hidden. For the sequence of module Ms, the works remain a "read after be written" process only, and become an intellectual act corresponding to the algorithm without any relation to the computer structure in the form. This is the reason for the natural possession of a match between flow and sequence, the human effort only directs to the processing form for Ms (for example, converting into a direct valuated statement, or a grammar structure). Moreover, in these processes, Ms enters to the running control of computer as an input information included in the program objectively. As a result, the single processor can further enter to a better adaptability from the match ability, and make a success in the generality.

The model that can be matched on flow-sequence in previous art will be described in below:

In the multi-machine structure, there are N flows naturally, and N independent sequences can be supported. However, there are N+1 sequences in a model in fact, so they can not be matched. In the previous research on distributed and parallel processing, the research of flow-sequence element is not introduced into the computer architecture, and the environment for solution is located in the environment of "N independent programs+interconnection structure for multi-machine", furthermore, the problem of matching flow and sequence is neglected.

However, according to the principle that the sequence is a model parameter, the user model in any architecture can not operate without the input of Ms. Furthermore, according to the principle of the match among N+1 flow-sequences, the $N+1^{st}$ "global flow" structure capable of supporting the global sequence Ms can be found from the system inevitably for any applicable case in previous art.

The "time slice" structure often used in a parallel system forms the N+1st self-driving flow, which is independent of N single-processor programs, by timing interruption. Obviously, during the matching of the N+1st flow-sequence, the global sequence Ms lies in a distributed sequence state shown in FIG. 1E, and the time slice flow is an global flow having a structure capable of matching with the Ms sequence in distributed state. As a result, the algorithm is limited to a mode that "the synchronization is handled (to solve the communication problem) after the internal computing of time slice", The control interface of the mode is "N programmable programs+one time slice flow-sequence".

The Ms structure shown in FIG. 1E can be implemented by the meticulous programming of the programs in each flow-sequence Si. In this case, however, the N+1st flow is a virtual-driving flow superimposed on each flow-sequence Si and connected by tokens, Therefore, for the matching of the N+1st flow-sequence, not only N programs related should be programmed, but also a large amount of multi-machine structure parameters must be handled. Furthermore, this mode relates to the specific model, and an individual matching is required. Although it can be running, it can not provide the general modeling for the user. The invention recognizes that such mode still not reaches stage for a match between flow and sequence in the instruction layer. Therefore, the establishment for a match between flow and sequence with the previous art may be expected only with the high-level language layer.

The reasons for unsuccessful multi-machine adaptability will be described in below:

Firstly, in the multi-machine structure, there are N flows naturally, which can support N independent sequences, though there are N+1 sequences in a model actually. In previous art, however, the working habit was not changed in its research of distributed and parallel processing, and the flow-sequence element is not introduced into the computer architecture (same for the previous single-processor architecture research). Furthermore, the environment of solution is located in the environment of "N independent programs+interconnection structure for multi-machine". The problem of matching flow and sequence is neglected. As a result, in the previous art, a structure capable of matching can emerge without the teaching of a well-found theory and method.

Secondly, it is an important concept that the sequence of module Ms is a parameter of input information, and an essential breakthrough is made hardly for an architecture research without such concept. In the previous art, the algorithm in the signal-processor environment is simulated, and the problem of sequence Ms solution is excluded from the architecture research, leaving it to the algorithm or modeling. Thus, the modeling is very difficult, and various characters of sequence Ms are generated naturally, even though the matching is successful. The unifying multi-machine operating system can not be generated since there is no processing specification for Ms. Therefore, the arrangement of leaving Ms with the algorithm is a direct reason for the failure to generalize so that the industrialization can not be realized forever in previous art.

Thirdly, in the previous example capable of matching, N+1 flows are consistent with N+1 sequences in their numbers, and the match between flow and sequence is obtained so that a multi-machine system can be operated. For the match between flow and sequence, some different modes are developed. However, the layer and control interface in all these matching modes can not meet the need of diversity for adaptability.

In the previous technology capable of modeling, the distributed structure in a model is not improved so that the N+1st flow built unconsciously by a user must be an "global+distributed" flow. Because it is very difficult to build such a flow in the multi-machine structure, an global parameter (for example, time or synchronous instruction, etc.) must be introduced to generate an global flow based on the new parameter, and the Ms should be modified to match with the new parameter. After the implementation of an associated match between the N+1st flow and the new parameter, the match between flow and sequence for original N programs should to changed to connect the N+1st flow-sequence (based an other parameters). At last, the system is operational, and the system modeling is clear. However, the generality of model is limited by the new parameter, moreover, the well adaptability is lost.

All the N+1st flow build can not reside in the hardware layer and enter to the instruction flow format as those in the single-processor. Therefore, the matching quality of all N+1 flows (especially the N+1st flow) is the essential reason for the failure to popularize these applications.

SUMMARY OF THE INVENTION

The invention recognizes that according to the discovering from the structure in FIG. 1E, there is N+1 sequences in a model, and N+1 flows are required to match with them. However, in these N+1 flows, there are no any natural structures as those in the single-processor, and the field of manual building should be entered. The building of the N+1st flow aims at the capability of loading the sequence of model Ms, and the effect of performing parallel module operation driven by N+1 flows.

The invention further recognizes that making a matching way for N+1 flows and N+1 sequences with optimum character is required by the adaptability. The optimum match should have the ability to solve the 3* problem. The match of optimum-character is the direct matching of flow and sequence in the hardware layer, and a control interface for N+1 instruction flows can be further produced to realize the "layer and capability" required by the adaptability.

The invention is a theory having its own unique system, referred to as "sequence-net". Its model analysis is shown in FIG. 1D and FIG. 1E at first, then a fundamental scheme is indicated in FIGS. 2A, B and C for expanding to FIGS. 2D, E and F. The "sequence-net" particularly refers to the parallel structure comprising N+1 flow-sequences as shown in FIGS. 2A, B and C and FIGS. 2D, E and F".

The effects of sequence-net are as follows:

It is an unique way capable of representing the "flow-sequence element" up to now.

The N+1st sequence in a parallel module is discovered.

The matching structure for N+1 flow-sequences in sequence-net representation is built (could become instruction).

The computer structure in sequence-net representation, that is, the sequence-net computer, is built (the match between flow and sequence hardware layer).

During the mapping of sequence-net, the unchanged functions of the parallel module are maintained in the sequence-net environment.

During the mapping of sequence-net, the changed structure of distributed token (changed) is defined in the sequence-net environment.

The term "sequence-net" will be used extensively in below description.

To realize the target of adaptability, a multi-computer structure having N+1 flows in parallel based on the sequence-net description should be built by the invention, so that the input of sequence Ms of parallel module can be accommodated. For this target, the invention recognizes that a reform of the sequence Ms from the module is required and the structure of multi-computer should be changed to adapt to the sequence of module Ms. An interface layer that both the model and the computer structure can be implemented should be invented.

With such layer, the invention provides some very simple steps for implementation, wherein:

The "global sequence+distributed sequence" structure of Ms is modified from the view point of model, and a new module sequence structure having "N+1 independent sequences" is produced in the invention; and N+1 independent flow structures are implemented from the view point of computer structure, and they are matched with the structure of "N+1 independent sequences".

Similar to that there are different description methods for the Turing machine and the state machine, there will be some methods other than sequence-net to describe the Ms sequence, in future. After the understanding of the requirement for the N+1st flow to support the Ms, other description methods for the flow structure supporting Ms and for the computer structure capable of supporting Ms may be used. In the invention, the mapping of sequence-net is used to build the N+1st sequence so that all N+1 sequences are transformed into the sequence that can be matched with the independent serial-flow structure.

This way can be realized by a computer structure. Therefore, in the invention, from the viewpoint of computer structure, the N+1 flow-sequences and the token structure for sequence-net shown in FIGS. 2A, B and C are defined as the new computer structure of the invention with sequence-net description, and it is called sequence-net computer for short.

Furthermore, from the view point of computer structure, the high level abstraction ability represents the separableness among all N+1 flow, the instruction-capable matching mode of N+1 flow-sequences, the distributed (data) token structure in sequence-net environment, etc. They are the significant distinctions from previous art, and are the key characters of sequence-net computer structure of the invention.

In the sequence-net as shown in FIGS. 2A-FIG. 2F in below, the descriptions will be set forth from both the view points of model and computer structure with the sequence-net as a link plane of both. Therefore, the parameters marks Sc, and Si in the sequences-net structure should be both described as a sequence of model, and described as a flow of computer structure. Or in sequence-net computer combined flow and sequence, it is called flow-sequence.

One of the object of the invention is to provide a novel parallel processing model which realize generality in the model layer.

One of another object of the invention is to provide a novel parallel processing method which realize generality in the model layer.

The object of the invention is to provide a novel sequence-net computer architecture. It creates a parallel operating structure which owns (N+1) independent-operating flow-sequence and controls its oneself token of distributed-structure independently through new instructions. Wherein N Sis are independent-operating flow-sequences and an independent-operating consistency flow-sequence Sc structure having the consistency tokens as its components is built. The cooperative operation of N+1 flow-sequences is supported by the interconnection structure for multi-machine with distributed token.

The object of the invention is to provide a novel sequence-net computer architecture. It creates a parallel operating structure which owns (N+1) independent-operating flow-sequence and control its oneself token of distributed-structure independently through new instructions. Wherein N Sis are independent-operating flow-sequences and an independent-operating consistency flow-sequence Sc structure having the consistency tokens as its components is built. In the connecting structure between multi-machine, data-token which are built by bounding data and token supports the running of cooperation among N+1 flow-sequence.

The another object of the invention is to build a structure based on multi-computer parallel processing structure to implement the functions of sequence-net, wherein there are N modular units with same structure, and be interconnected with a bus. Each modular unit comprises an independent computer (replaced by PC for description convenience in below), a data-token control and array module, and a cell-computer-based cell module. The parallel module comprises N PC programs and a consistency flow-sequence Sc (or a programmed consistency flow-sequence Pcon), and the data-token system with distributed structure supports the operating synchronization and data transmission of N+1 programs, and performs the computing function of parallel modules.

According to the object of the invention, a parallel processing module offered by the invention comprising N, a natural number larger than 1, flow-sequence components each including a plurality of source tokens and destination tokens, wherein further comprising an consistency flow-sequence component composed of consistency tokens to build a distributed token structure together with one source token and one or more than one destination token corresponding to said one source token in said N flow-sequences, wherein said distributed token is controlled by said consistency token resided in it to perform the consistency operation, and when the source token value in said distributed token structure is invalid, said consistency flow-sequence is controlled by said consistency token for waiting, and when the source token value in said distributed token structure is valid, said destination token value in said distributed token structure is valid.

According to another object of the invention, a parallel processing method offered by the invention running independently N, a natural number larger than 1, flow-sequences each comprising a plurality of source tokens and destination tokens, wherein further running an consistency flow-sequence composed of consistency tokens to build a distributed token together with source token and one or more than one destination token corresponding to said one source token in said N flow-sequence, wherein said parallel processing method comprises the steps as follows:

(1) Each said flow-sequence runs independently, and the source token value is valid when said flow-sequence runs into the source token;

(2) Said consistency flow-sequence runs parallel to said flow-sequence, said distributed token is controlled by said consistency token resided in it to perform the consistency operation when said consistency flow-sequence runs into said consistency token, and said consistency flow-sequence is controlled by said consistency token for waiting when the source token value in said distributed token is invalid, and said destination token value in said distributed token is valid when said source token value in said distributed token is valid; and (3) When said flow-sequence runs into the destination token, said destination token value is tested, if the destination token value is invalid, said flow-sequence is waiting, and if the destination token value is valid, the run of said flow-sequence continues.

According to another object of the invention, a parallel processing module offered by the invention comprising N unit modules, an consistency flow-sequence and a data-token bus, wherein said every unit module is connected with said data-token bus and the consistency flow-sequence through consistency flow-sequence interface in the module; every said unit module comprising the PC, data-token control module and data-token array, said PC connects with data-token array via PC connecting device in said data-token control device, perform reading and writing operating of said data-token array via said data-token control module, said consistency flow-sequence is connected with multi-computer connecting device in said data-token control module, said multi-computer connecting device is connected with data-token array and data-token bus separately, and transforming data and token through said data-token bus, realize data-token consistency operating among N unit module; said data-token array comprises of data bits and token bits, said consistency token sent by consistency flow-sequence comprises of trigger time sequence and data-token address.

BRIEF DESCRIPTION OF THE DRAWING

Now, the structure description of the invention begins. You will find that the drawing of same sequence-net structure will appear in different layers which match sequence, flow and flow-sequence. The novel features, usages, objects and the likes of the invention will become more apparent from the detail description of the preferred embodiments in conjunction with the following drawings in below, wherein

FIG. 1C is a model of the Turing machine in previous art;

FIG. 3G is the parameter character of read module data instruction RMD;

FIG. 3H is the parameter character of write module data instruction WMD;

FIG. 3I is the parameter character of data-consistency instruction DCO;

FIG. 5 is the expansion type of consistency instruction.

DETAILED DESCRIPTION OF THE PREFERRED EMBODIMENTS

Various objects and advantages of the invention will be further described clearly below in conjunction with the accompanying drawings.

Figure 2A:
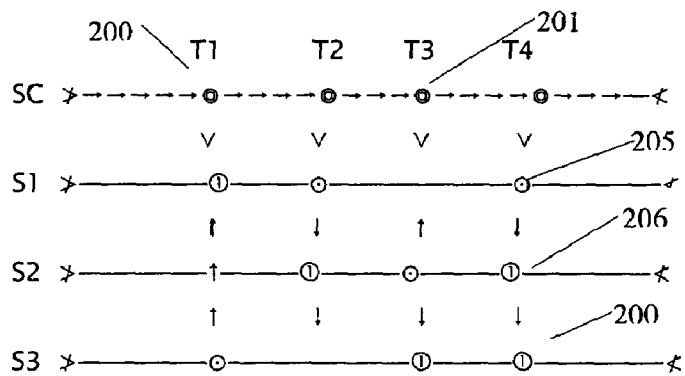
FIG. 2A shows the sequence-net and the consistency sequence Sc.

FIG. 2A shows the sequence-net and the consistency sequence Sc.

Figure 1A:
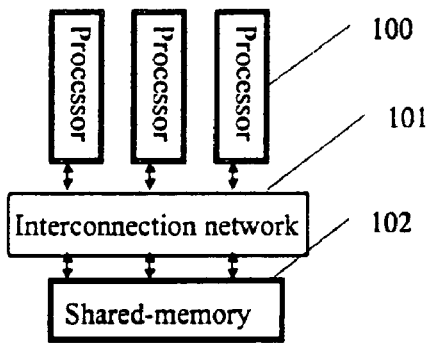
FIG. 1A is a schematic diagram of shared-memory structure type in previous art.
Figure 1B:
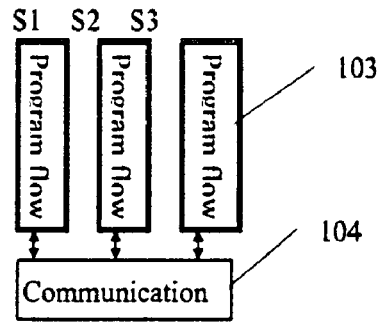
FIG. 1B is a schematic diagram of network of workstation s type in previous art.
Figure 1D:
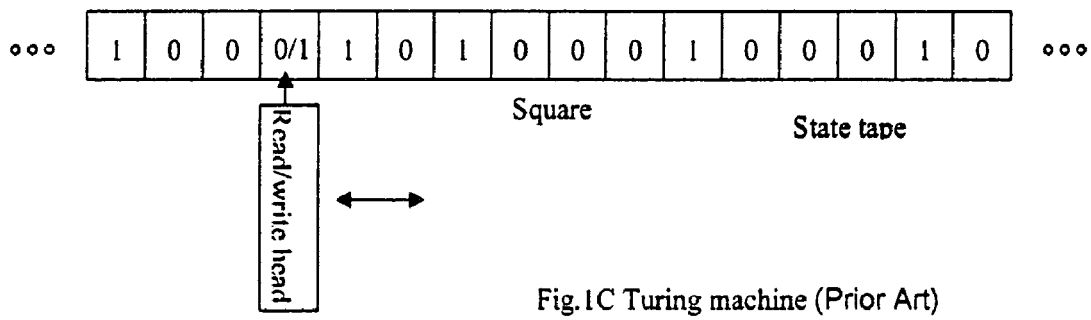
FIG. 1D is a typical abstraction of parallel flowchart.
Figure 1D:
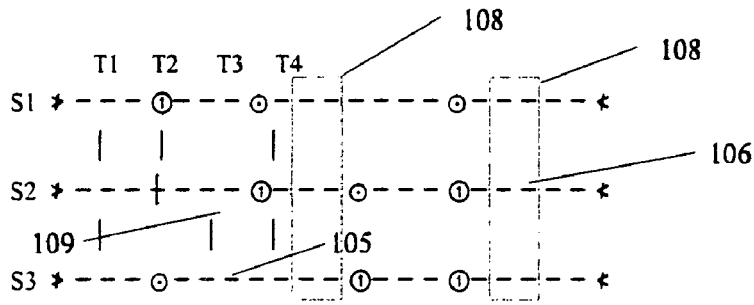

In FIG. 2A, the parallel module shown in FIG. 1D is reformed for building a new form of N+1 sequences. Therefore, it has the same functions as those in FIG. 1E. As shown in FIG. 2A, in the invention, the sequence of substantially independent module Ms is separated from the distributed sequences Si by the mapping in structure under the sequence-net environment to generate the N+1st sequence Sc having an independent structure. All N+1 sequences are transformed into the mutual isolation (that is, without sequence transfer relation between processors) sequences, then an interface of new N+1 independent sequences that both the model and the multi-computer structure can be accepted is produced to represent the parallel module.

Figure 1E:
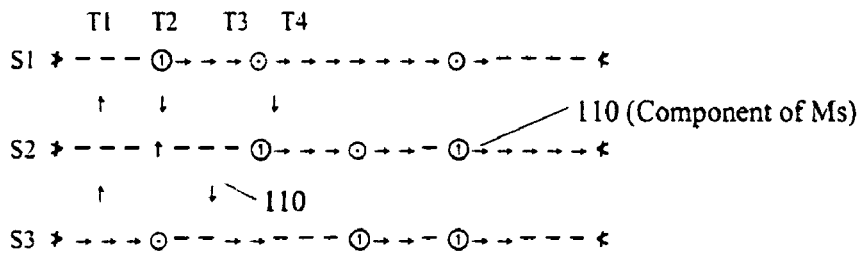
FIG. 1E is a sequence of module Ms existing in the interconnection among multiple sequences Si.

The mapping procedure in the parallel environment of sequence-net means that the functions of parallel module shown in FIG. 2A and FIG. 1E are not changed. Therefore, it is a part of the invention that the Sc transformation is realized by the Ms (within the invention) mapping. The invention further includes the corresponding changes of each flow-sequence Si and changes of token structure.

The transformation from FIG. 1E to the sequence-net structure (in module layer) in FIG. 2A is as follows:

(1) a N+1 sequence structure parallel to each sequence Si is added to replace the sequence Ms 110, and referred to as consistency sequence Sc in the invention;

(2) the consistency sequence Sc is also arranged with the tokens referred to as consistency tokens 201, and the consistency tokens 201 in consistency sequence Sc are different from the tokens in other sequences Si in both structure and function; and (3) the original structure of combined token 108 is transformed into a new distributed structure token (named distributed token in brief below) to ensure the function of module is not changed during the transformation of structure from N flows to N+1 flows. Therefore, after the addition of consistency tokens, the structure and function of the source token 205 and the destination token 206 are changed correspondingly.

As shown in FIG. 2A, in the sequence-net, a structure of consistency sequence Sc and a new component, the consistency token 201 (shown in ⊚ symbol), are introduced. The consistency sequence Sc consists of the consistency tokens 201 only, and has the characters of sequence as in the sequences S1, S2 and S3. As a component, the consistency tokens 201 are arranged sequentially in the consistency sequence Sc to show the sequence of the distributed tokens T1, T2 . . . . When the run of Sc enters to the consistency token 201, the transmission from source token to destination token within the distributed token 200, named token consistency operation, will be taken place by a control (indicated by the symbol V in FIG. 2A).

The distributed token 200 comprises an consistency token 201, a source token 205, and several destination token 206, inserted into the consistency sequence Sc and different sequences Si respectively. The run of the sequences is proceeded as follows:

(1) When the run of sequence Si enters to the source token 205, the valid flag of token (=1) is set;

(2) When the run of sequence Si enters to the destination token 206, the valid flag of token is tested, and the run of Si is controlled by the test result;

(3) When the run of consistency sequence Sc enters to the consistency token 201, the consistency-transmission operation within distributed token is activated. The consistency operation is a broadcast transmission of token value from source token 205 to destination token 206 taken place within the distributed token 200. During the broadcast transmission procedure, the consistency token will test the token. When the source token is invalid (=0), the consistency token will be held at a waiting state (namely, the sequence Sc is waiting) until the source token is valid (=1), then the consistency operation procedure of distributed token enters to the end, and all the destination tokens are valid (=1).

As a comparison to FIG. 1D, it is the distinguish feature of the invention that the potential transmission function for multi-machine in the source token and the destination token is eliminated. (In the previous art, "write-consistency" or "read-consistency" are often used to bind the token and the transmission function for multi-machine). The sequence is localized with respect to the structure of source and destination tokens operation. It means that each sequence Si runs to a proper point to cause the operation of source token 205 and destination token 206 limited within the local structure range, and is independent of the token consistency transmission. As a result, the condition for each Si entering single-processor programming environment is prepared.

In the invention, the procedures for the sequence transformation from Ms in FIG. 1E to Sc in FIG. 2A are as follows:

(1) the module is divided into N sequences in parallel;

(2) the distributed tokens to connect among N sequences are found out;

(3) the sequence of each distributed token is arranged with Ms as the reference; and (4) the sequence of distributed token are transformed into the consistency sequence Sc.

Global sequence Ms mapped is changed into three components and their connection. They are local consistency sequence Sc, local consistency token ⊚ and global consistency operation ∨ Local feature of sequence Sc and consistency token is important for matching with flow from computer. Global consistency operation is a broadcasting transmission. Then, there is no global feature indeed in Ms sequence. The above-mentioned procedure is an important part of the invention, wherein the model is reformed for purpose of flow-sequence matching.

The structure of N+1 sequences in sequence-net indicates that there are N+1 sequences for running of a parallel module, then called sequence space with N+1 dimension.

Figure 2B:
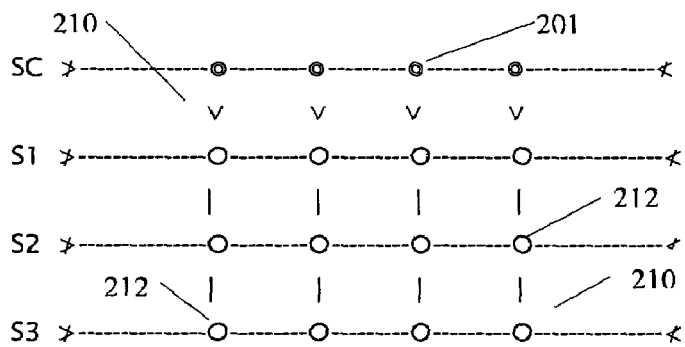
FIG. 2B shows flow structure of the sequence-net computer matched with the consistency sequence.
Figure 2C:
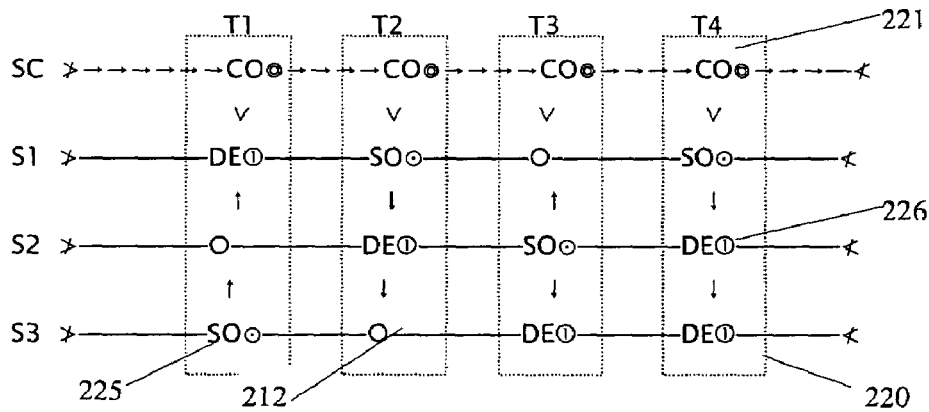
FIG. 2C shows that the function of sequence-net shown in FIG. 2A is implemented by the instruction loading to the flow structure shown in FIG. 2B.

After the completion of the reformation in model for purpose of flow-sequence matching in FIG. 2A, the invention further makes a reform in the flow for purpose of flow-sequence matching in FIG. 2B and FIG. 2C which can be implemented by the computer structure design.

FIG. 2B shows flow structure of the sequence-net computer matched with the consistency sequence;

FIG. 2B is obtained by extracting the particular source token, destination token, and the sequences load on the flow from FIG. 2A. It is a N+1 flows structure that can support the sequence-net and implement the flow-sequence matching. This structure becomes a part of hardware structure of sequence-net computer in the invention. In FIG. 2B, the Sc, S1, S2 and S3 in broken line represent the empty state without loading, and the elements corresponding to those in FIG. 2A are designated with like name and symbol to indicate the matching of flow-sequence.

As shown in FIG. 2B, the structure comprises an consistency flow Sc structure, the consistency token 201 (show with symbol ⊚), and a new component, idle token 212 (show with symbol O). The consistency flow Sc and flows S1-S3 are all the flow in empty state. The consistency flow Sc is the flow comprising the consistency tokens 201 only, and the flow Si is the flow comprising the idle tokens 212 only. The idle token is a token characterized in that it is defined as a source token or a destination token immediately when it is actuated by a token in the flow. The distributed token 210 can be controlled (shown by symbol ∨ in FIG. 2B) by the consistency token 201 to perform the token consistency operation internally.

The idle token with distributed structure (referred brief to as distributed idle token in below) 210 consists of an consistency token 201 and N idle tokens 212 inserting into the consistency flow Sc and other flow Si respectively. The run of these flows is as follows:

(1) When the run of flow Si enters to a proper point, the idle token 212 may be transformed into a source token 205 or a destination token 206, and their corresponding operation is performed;

(2) When the run of consistency flow Sc enters to the consistency token 201, the consistency-transmission operation within the distributed idle token is activated. The consistency operation is a broadcast transmission of token value from source token 205 to destination token 206 performed within the range of distributed idle token 201. During the procedure of broadcast transmission, the consistency token 201 will test. In case of having a source token, the process continues sequentially. When all the tokens are idle tokens or destination tokens, the consistency token 201 will be held in a waiting state.

As a comparison to FIG. 1D, the invention is characterized in that the flows Si is localized with respect to the structure of idle token operation. It means that the operations of idle token 212 for each flow are limited within the local structure range and independent of the token consistency transmission.

From the viewpoint of flow, it is optimum that the driving is represented by the instruction. Thus, it is required that the flow structure provides an instruction system which are called sequence-net instruction. As a result, the hardware structure is represented by N+1 sets of instruction programming. With the support of distributed idle token 210, the invention designs a structure that the token is actuated by the instructions inserted in the flow. In the invention, there are three basic instructions named sequence-net token instruction set as follows;

consistency instruction CO
source token instruction SO
destination token instruction DE The consistency flow Sc comprises the consistency instruction CO, and flow Si comprises the source instruction SO and destination instruction DE. The consistency operation of distributed token 220 is performed by the CO instruction with the support of hardware. The idle token 212 is transformed into a source token by the instruction SO 225, and the idle token 212 is transformed into a destination token by the instruction DE 226.

FIG. 2C is an illustration showing the implementation of sequence-net functions shown in FIG. 2A through the loading of N+1 sets of instruction flow on the flow structure.

In FIG. 2C, it is shown that the function of N+1 sequences are performed the loading of three sequence-net token instructions described above on the structure shown in FIG. 2B. For clear understanding at a glance, the original symbols of source and destination tokens are illustrated. In addition, the idle token 212 is a structure disable in case of no actuative instruction.

The functions shown in FIG. 2A can be obtained through the instruction actuation and the token definition with N+1 flows driving. They have been described in above sections with corresponding symbols identical to those in FIG. 2C, the difference is that the sequence showed FIG. 2A is replaced with flow-sequence here. So they are not repeated in here.

Obviously, the functions of parallel module in sequence-net as shown in FIG. 2A can be implemented as flows:

| S1 | S2 | S3 | Sc |
|---|---|---|---|
| START | START | START | START |
| DE (T1) |  | SO (T1) | CO (T1) |
| SO (T2) | DES (T2) |  | CO (T2) |
|  | SO (T3) | DE (T3) | CO (T3) |
| SO (T4) | DE (T4) | DE (T4) | CO (T4) |
| END | END | END | END |

(Where, each instruction flow is continual, and the spaces are used for understanding only)

According to FIGS. 2A, B and C, from the viewpoint of flow-sequence matching, the invention is characterized in that it is discovered that there are (1) N+1 sequences in a parallel module actually, and N+1 flows are required to match with them for purpose of sequence independently;

(2) The reformation is taken place by means of mapping for N+1 sequences, and the "independent and separative" character of N+1 sequences in the invention is built;

(3) The match between N+1 instruction-capable flows and N+1 sequences mapped through sequence-net is established;

(4) The run of parallel module is performed by the instruction loaded and the distributed token cooperatively through the drive from N+1 flows, and (5) All the features of (1)-(4) are evolved in the parallel-module environment of sequence-net through the support of distributed token structure.

In contrast with the FIG. 1D, the structure of FIG. 2A, FIG. 2B and FIG. 2C (including three sequence-net instructions) which based on the description of flow, is a novel computer architecture (a detailed description will be given later by the embodiment of the invention). Computer is characterized in that there are N+1 driving flows (only n driving flows for the previous art in FIG. 1D), and the token function is implemented through the instruction. Another key feature of the novel computer architecture in FIG. 2B and FIG. 2C is demonstrated by the fact that the new computer structure is represented with the sequence-net environment. The characters of parallel, independent, serial, separation, and instruction-capable for N+1 flows can be reflected (in previous art, the N+1st flow is often distributed with other parameter in it, and hard to represent by the instruction). Therefore, the invention is also characterized by the sequence-net environment.

In the application, the procedures of modeling and programming in the sequence-net will be the procedures in which the model is transformed into the sequence-net, and the sequence-net is transformed into three instructions. The capability of model adaptation provided by N+1 instruction flow should be better than that provided by N instruction flows in previous art.

Figure 2D:
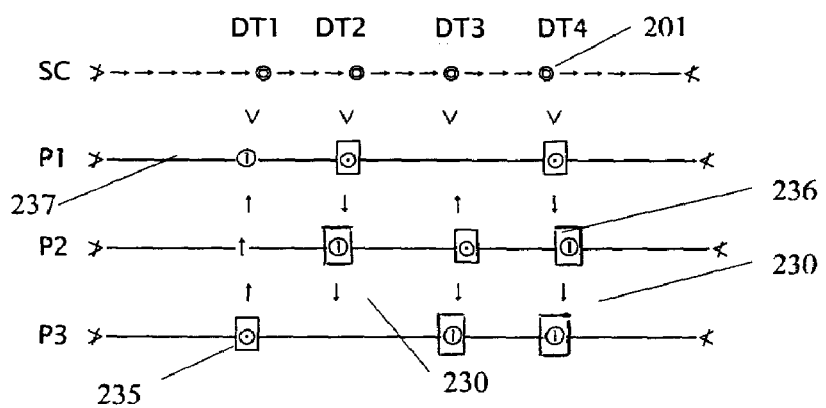
FIG. 2D is on expansion from token to data-token in sequence-net model.

FIG. 2D is on expansion from token to data-token in sequence-net model;

FIG. 2D is aiming at the elimination of token parameter at the user programming interface for the 3* problem. The solution of the invention is that the token is transformed into the data-token, and the sequence-net token instruction is transformed into sequence-net data process instruction on sequence-net N+1 flows condition.

From FIG. 2A to FIG. 2D, the structure is expanded under the condition of maintaining the function of N+1 sequences in sequence-net as follows:

(1) the data are combined with the token to build the structure of distributed data-token 230;

(2) the consistency sequence Sc transforms the sequence of modular date Which can express in data.

After bounding data and token the describing way of sequence-net has been turned from token to data which can be recognized by model. In this way the processing ability of flow-sequence is too simple in model. So that flow-sequence Si is replaced with program Pi.

(3) The program Pi enters to the form of multi-PC program Pi 307, and the structure of consistency sequence Sc is not changed.

As the embodiment shown in FIG. 2D, the token of distributed modular data DT (that is, distributed data-token for brief) 230 is generated with the combination of modular data and distributed token. In the token 230, the source token 205 ○ is transformed into the source data-token 235 ▨; the destination token 206 ① is transformed into the destination data-token 236 ▨; and the consistency token is not combined with the data, and is still shown by symbol ⊙. The consistency sequence Sc is still a flow-sequence comprising the consistency token 201 only (without data), and the consistency token components are arranged in Sc as a series to show the sequence of distributed data-token DT1, DT2 . . . . When the consistency sequence Sc runs to the consistency token 201, the data and token transmission from source to destination performed within the distributed data-token 230, named data-token consistency operation, will be taken place by a control (indicated by the symbol ∨ in FIG. 2D).

The distributed data-token 230 comprises an consistency token 201, a source data-token 235 and several destination data-tokens 236, inserted into the consistency sequence Sc and the different programs Pi respectively. The functions of those tokens are as follows:

(1) when the source data-token runs in the PC program, the source data process is performed, and the source token is set (=1);

(2) when the destination data-token runs in the PC program, the destination data process is performed, and the destination token is tested; and (3) the consistency token 201 is the connection point of consistency sequence Sc and distributed data-token 230, and when the Sc runs to this point, the operation of data-token consistency transmission is actuated. The consistency operation is taken place within the range of distributed data-token 230, and comprise a data broadcast transmission from source data to destination data in the global range and a token broadcast transmission from source token to destination token in the global range. During the transmission procedure, the token value in global transmission should be tested by the consistency token. In case of an invalid source token (=0), the consistency sequence Sc is held in waiting by the consistency token until the source token is valid (=1). Then the operation procedure of distributed data-token enters to the end, and all the destination data is valid, and all the destination tokens are valid (=1). Obviously, as those shown in FIG. 2A, the direction of information flow in data-token consistency operation is defined by the source and destination tokens for the transmission structure.

With the support of distributed data-token, the new parallel structure is directed by "N+1 flow-sequence of sequence-net which comprise sequence-net consistency flow-sequence Sc and N programs Pi" (that is, Sc&Pi for brief). The relation of token value is established in the procedure of data operation for program as follow:

(1) when each program Pi 237 runs to the source data-token independently, the source data process is performed, and the source token is valid (=1);

(2) when each program Pi 237 runs to the destination data-token, the destination token is tested, and the destination data process is performed, then the local program will be paused or continued depending on the test result (0 or 1); and (3) the consistency sequence Sc runs independently as the program Pi 237, and when an consistency token 201 is met, the operation of consistency transmission within the distributed data-token 230 is activated; if there is a source token in the transmission procedure (=1), the consistency sequence Sc enters to next consistency token subsequently; otherwise (=0), the run of Sc pauses.

From the viewpoint of sequence concept, the consistency sequence Sc and the sequence Si are isomorphic sequences in FIG. 2A. However, in FIG. 2D, the sequence Pi is different from the consistency sequence Sc explicitly. Pi comprises the data the data computation, and the process of write/read for source data-token/destination data-token. The Sc still comprises the consistency tokens only without the intention of computation. Both the Pi and the Sc should support the sequence-net to enter to data computation function. Furthermore, in FIG. 2D, the data consistency is different from the token consistency within distributed data-token. The token consistency relates to N+1 sequence of sequence-net, and the data consistency is transferred among N programs only. Its reason lies in the fact that the consistency sequence represents as a "pure" sequence without data-based model parameters due to the structure environment of sequence-net.

Similarly to the Pi, the consistency sequence Sc structure is a sequence input. As for the performance order, with the support of the binding structure of data and token, the sequence of consistency token is the same sequence of modular data. In contrast to the previous art, the generation of the sequence of the modular data is a new work for the invention. The consistency sequence Sc can be generated by the arrangement of the modular data sequence Ms in the model layer, and represented by the address.

As a comparison to FIG. 2A, in FIG. 2D an important character of the distributed data-token is the binding together of data and token. This change is significant for programability since the token is a parameter proliferated in multi-machine structure, not a parameter of the model, and it should be eliminated due to the fact that it can not be recognized in the model. While the data is a parameter of the model, the token can be designated and programmed with a data form after the binding, and the token value can be associated with the read/write operation of data to use in, for example, data validness indication, thus the token, as a parameter, is eliminated at the programming interface.

In the invention, the data and the token are memorized by a memory array; thereby the binding means that the data and the token are in a same address, and interfaced with the PC program and the consistency sequence Sc in a address form. For the consistency token 201 comprised the consistency sequence Sc, there is no data binding, however, the sequence of consistency token still can be replaced by the sequence of distributed data-token at the programming interface.

According to the invention, within the field of model the procedure of transformation from sequence Ms in FIG. 1E to consistency sequence Sc in FIG. 2D is as follows:

(1) the module of model is divided into N independent programs;

(2) the data (modular data) connect among N programs are found out;

(3) the sequence of each modular data is arranged with Ms as the reference; and (4) the sequences of modular data are loaded the flow structure of consistency sequence Sc.

All the steps described above are represented in a data form for user modeling convenience.

In FIGS. 2A, B, C, sequence-net computer shows in flow-sequence space with N+1 dimension. After the binding of data and token in FIG. 2D, in consistency operation, data is transferred between N Si or Pi, and not go into Sc, then, called data space with N dimension. Two special features for a parallel module are that there are flow-sequence space with N+1 dimension and data space with N dimension. Sequence-net computer in FIGS. 2D, E, F shows both flow-sequence and data features.

Figure 2E:
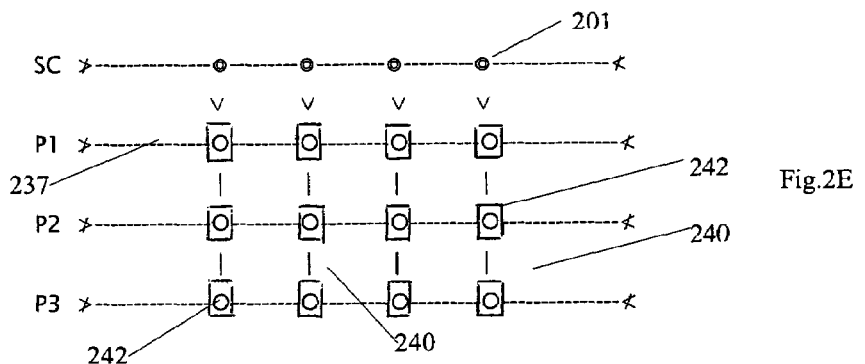
FIG. 2E is a computer structure to support FIG. 2D.
Figure 2F:
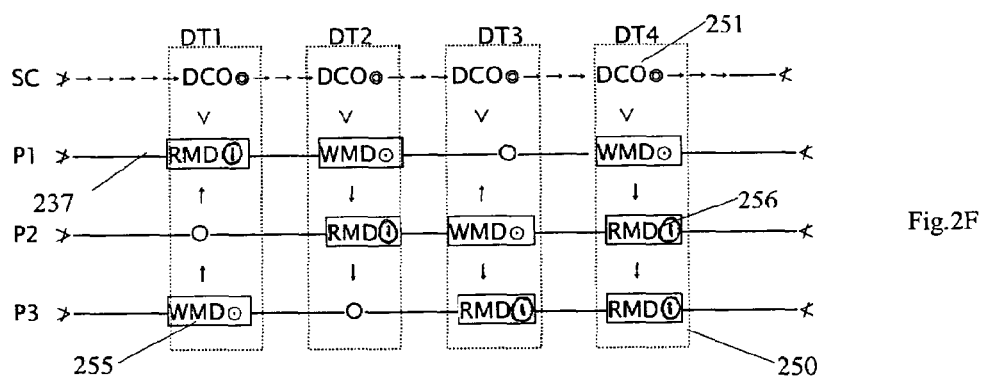
FIG. 2F shows that the function of sequence-net shown in FIG. 2D is implemented by the instruction loading to the flow structure shown in FIG. 2E.

After the completion of the data-token reformation in model as shown in FIG. 2D, the reformation in computer (can be implemented by the design of computer structure) is further realized in FIG. 2E and FIG. 2F by the invention.

The FIG. 2E is a computer structure to support FIG. 2D.

The FIG. 2E is obtained by extracting the particular source and destination data-tokens and loading sequences. It is the sequence-net computer structure of the invention that supports the sequence-net structure containing data-token with a N+1 flows structure to implement the match between flow and sequence. In FIG. 2E and FIG. 2D, the corresponding components in match are designated with same name and notation to indicate the match.

As shown in FIG. 2E, the structure comprises an consistency flow Sc structure, the program structure Pi, and consistency token 201 (shown by symbol ⊙), and a new component, idle data-token 242, shown by symbol ▯. Both the consistency flow Sc and the programs P1, P2, and P3 have the character of flow, but they are in an empty load state (shown by broken line). The consistency flow comprises the consistency tokens 201 only, and the program Pi only consists of the idle data-tokens 242. The idle data-token is a data-token characterized in that when it is actuated by an instruction in the program, it can be defined as a source data-token or a destination data-token immediately. The idle data-token in distributed structure (that is, distributed idle data-token for brief) 240 can be controlled (shown by symbol V in FIG. 2B) by the consistency token 201 to perform the data-token consistency operation internally.

The distributed idle data-token 240 comprises an consistency token 201 and N idle data-token 242 inserted into the consistency flow Sc and other program Pi structure respectively. The runs of Sc and Pi are as follows:

(1) When the run of Pi enters a proper point, the data-token may transform to a source data-token 235 or a destination data-token 236, and their corresponding operations is performed according to the type of token; and (2) When the run of consistency flow Sc enters to the consistency token 201, the operation of consistency transmission within the distributed token is activated. The consistency operation is a broadcast transmission of data and token value from source data-token 235 to destination data-token 236 performed within the range of distributed data-token 240. During the procedure of broadcast transmission, a validation test should be made by the consistency token, when all the tokens are idle data-tokens or destination data-tokens, the consistency token should be held in waiting state.

With the support of distributed idle data-token 240, the parallel operations are driven by Sc&Pi, and the token operations is activated by the programs. In the invention, the way to activate data-token by program is the establishment of instruction. Three instructions to activate the data-token are established in the invention, and also referred to as the sequence-net instructions set. They are the transformation of three instructions, that is, CO, SO, and DE, described in FIG. 2C under the condition of data-token environment and using data-token as the data validation flag.

These three instructions are as follows:
data consistency instruction DCO (instead of CO)
source data-token instruction DSO (instead of SO)
destination data-token instruction DDE (instead of DE)

In case of using token as a validation flag of data, read and write operation can be connected to destination token and source token. Sequence-net data-token instructions are transformed into sequence-net data instruction set:
data consistency instruction DCO
write (DT area) data instruction WMD (instead of DSO)
read (DT area) data instruction RMD (instead of DDE)

The data consistency instruction DCO is used to construct the consistency flow Sc, and the write data instruction WMD and read data instruction RMD are used to construct each Pi flow. Furthermore, the consistency operation of distributed data-token 250 is performed by the DCO instruction 251 with the support of hardware. The WMD instruction 255 transforms the idle data-token 242 into a source data-token. The RMD instruction 256 transforms the idle data-token 242 into a destination data-token. Apparently, three sequence-net data instructions relate to the data without any relation to the token representation mode, and can be recognized in the model layer.

According to the invention, it should be noted that the above-mentioned three sequence-net data instructions which replace data-token are in a basic form, and the invention allows the replacement of RMD to DSO and/or WMD to DDE, but in this case, the token value can not represent a new written valid data in this case.

In FIG. 2F, it is shown that the parallel functions shown in FIG. 2D are achieved by loading the three sequence-net data instructions described above on Sc&Pi based on the computer structure shown in FIG. 2E. For clear understanding at a glance, the original symbols of source and destination data-tokens are illustrated. In addition; the idle data-token 242 is a structure disable in case of no actuative instruction.

The functions shown in FIG. 2D can be obtained through the instruction actuation and the data-token definition driven by Sc&Pi. The function of FIG. 2D have been described in above sections with the corresponding symbols identical to those in FIG. 2F, and the difference is that 'the sequence' described in FIG. 2D is replaced with 'flow-sequence'. So they are not repeated here.

Obviously, the functions of parallel module in sequence-net as shown in FIG. 2F can be implemented with N+1 independent instruction flows as follows:

| P1 | P2 | P3 | Sc |
|---|---|---|---|
| START | START | START | START |
| RMD (DT1) |  | WMD (DT1) | DCO (DT1) |
| WMD (DT2) | RMD (DT2) |  | DCO (DT2) |
|  | WMD (DT3) | RMD (DT3) | DCO (DT3) |
| WMD (DT4) | RMD (DT4) | RMD (DT4) | DCO (DT4) |
| END | END | END | END |

(where the run of each instruction flows is continual, and the spaces are used for understanding only.)

From the view point of 3* problem in previous art, for the process in the invention, it is intended that a sequence element is forcedly extracted used for synchronization with the (pure) sequence structure, and the remaining structures are reconstructed, furthermore, a total solution of 3* problem is still required. It seems more difficult, but it is simplified in fact. Its reason lies in the fact that according to the invention, after the matching of the extracted sequence and a drive of flow, the extracted sequence, used as a given input, returns to take part in the solution work for 3* problem. This is a new way. It works for a solution to 3* problem after the requirements of the information in N+1 sequence are met. In FIGS. 2D-F, the description shows methods for total solution of 3* problem in previous art according to the invention as follows:

(1) the determination of the validity of data is the detection of token value in the destination data-token;

(2) the instructions are built to insert into the Sc&Pi, and the parameters of instruction are the modular data which can be recognized by the model; the instruction execution is transformed to the process of hardware to produce the operation of source data-token, destination data-token, and data-token consistency; and (3) the synchronization of N programs is directed by the drive of Sc flow-sequence, and each distributed date token is a synchronous point; the synchronization is handled automatically by the consistency token, the source token, and the destination token, and independent from user programming.

Obviously, the invention indicator that in the parallel and distributed field, in addition to the 3* problem in previous art, there is a more important problem of flow-sequence matching. The 3* problem is caused by the multi-machine structure, and the N+1st flow-sequence matching is a new information input required by the establishment of multi-machine structure. The invention achieves a success with the action that the N+1st sequence is handled first, then the 3* problem is solved with the description of sequence-net.

In the application, the modeling and programming based on the sequence-net computer will be the procedures in which the model is transformed into the sequence-net, and the sequence-net is transformed into three sequence-net data instructions. The capability of model adaptation provided by N+1 instruction flows should be better than provided by N instruction flows in previous art. Moreover, the structure of data-token allows all token parameters to represent with the model data parameters.

In FIGS. 2D-2F, the superior structure characters of the invention have been fully presented as follows:

when the modular data is processed with program, which is the programming models for shared memory;

all N+1 instruction flows are the single-processor programs;

the framework for sequence-net is an general structure without the parameters for multi-machine structure;

all programs are the model parameters without the token structure; and the control interface for N+1 instruction flows matched with the models are shown.

From FIG. 3, sequence-net computer will be changed from the sequence-net environment into the physical structure. In this structure, the N+1 flow-sequence is adapt already, and become the known basic computer structure— program, so that the flow-sequence subject of the physical structure layer has not and need not to be described in the previous patent on computer field. Therefore, in FIG. 3, the computer structure represents the implementation of the distributed data-token structure, or the implementation of three sequence-net data instructions, under the condition that the match among N+1 flow-sequences in the invention is confirmed. Particularly, this is the implementation of a hardware structure that the instruction is transformed into the source data-token (FIGS. 3B and C), the destination token (FIGS. 3B and D)+interruption, and the consistency token (FIGS. 3E and F). In this embodiment flow and sequence has been adapted and that is called flow-sequence. This means that sequence-net is the common interface of N+1 sequences in the model and N+1 flows in the computer structure. So that in this embodiment Sc is renamed to consistency "flow-sequence Sc", Si to "flow-sequence Si" and so on.

There are some ways to realize the sequence-net. An important structure feature in the invention is that multi-computer system is composed of N homogeneous modules. And N homogeneous modules create N+1 flows which adapt with N+1 sequences. The homogeneous modules is a limited condition to realize the sequence-net computer of this embodiment. So that there is more difficult to create sequence-net function in the embodiment than that using N+1 structure modules to. The structure of the embodiment showed in FIG. 3 owns N modules, and the structure of the embodiment showed in FIG. 4 further shows the feature of N modules.

Figure 3A:
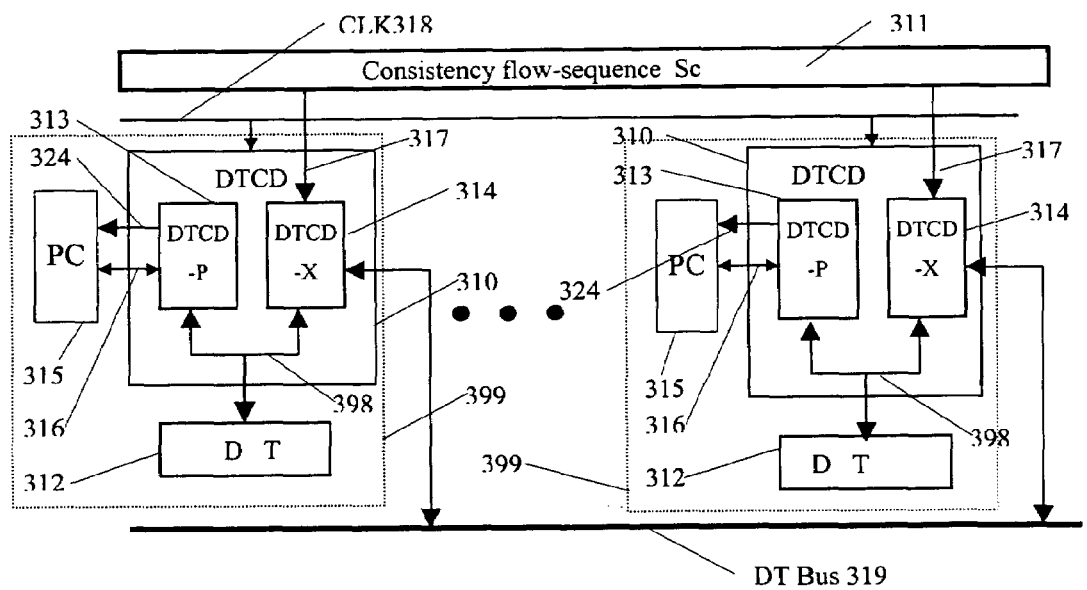
FIG. 3A is an embodiment structure of FIGS. 2D, E, and F.

FIG. 3A shows an embodiment of the structure for FIGS. 2D, E and F.

This is an embodiment of owning data-token-bounded structure, parallel-operating under the Sc&Pi driving and the multi-computer-based structure. It realizes a physical structure of the instruction of the source token, the destination token and the consistency token.

In addition to the implementation of sequence-net functions the specifications related generality such as the homogenous, the compatibility are taken into account in the invention so that the structure is suitable for SLSI, and the destination token interruption can be managed with operating system for user programming convenience.

In this embodiment, the structure comprises a global shared clock CLK 318, a set of DT bus 319 and overall consistency flow-sequence Sc 311, N unit modules 399 having a same structure and connected to said global structure. This is a typical distributed structure. In FIG. 3A, the DT bus 319 comprises a D (data) bus (32 bits for example) and a T (token) bus (1 bit for example).

The same information is sent from the consistency flow-sequence Sc 311 to the data-token control module DTCD 310 through each 317. The unit module 399 comprises a PC 315, a data-token control module DTCD 310 and a DT (data-token) array 312. For DT array 312, a memory array structure comprising data bit (for example, 32 bit) and token bit (for example, 1 bit) is used. A market available single-chip packaged dual port memory component or a general memory with a time division multiplexing structure built in DTCD 310 can be used as the DT array 312.

In DTCD 310, there are two external control input sets. The one is a local PC interface connecting the DTCD 310 to the PC 315 with PC bus (internal or external) specification 316. The another one is 317, an interface with the overall consistency flow-sequence Sc, In the interface 317, the address representing the consistency token and the trigger time sequence are received, then the data-token consistency with distributed control is realized by the data and token transmission on the DT bus 319.

There are two data access channel for DT array 312. One of the channel controlled by the instruction of PC 315 is connected to data-token control module DTCD-P 313, to perform the data access from PC to DT array 312. The another one channel is controlled by the consistency flow-sequence 311, thus the local DT array 312 is connected to the module DTCD-X 314, then connected to DT bus 319, to perform the global connection. The time-division control is required between the DTCD-P 313 and the DTCD-X 314 to coordinate the access to DT array 312.

The structure of DT array 312 is characterized in that the data and the token share an address, and are associated in their operations. The access addressing (from PC to DT array) is controlled by every PCs independently. In the access, the operation of data is connected to the PC through DTCD-P 313 so that the PC is in a bus access mode. However, the access content of token is not directly connected to the PC, and handled in the DTCD-P 313. The DTCD-P 313 performs the process of token value internally based on the definition of source and destination (data-tokens) implicated in the PC access (to DT array 312) instruction to achieve the functions of source and destination tokens shown in FIG. 2D.

The parameters of data consistency instruction from the consistency flow-sequence Sc 311 include the trigger and the data-token address, and are global transmitted simultaneously through the 317 through structure transformation of the DTCD-X 314, and changed into the distributed addressing for each DT array 312 and distributed control. Through cooperating on the DT bus 319, the distributed control performs the broadcast operation of "read-sending-write" among the processors, that is, the consistency operation of data-token.

Correspondence Relationship of Structure Between Sequence-Net and the Embodiment The specific instruction to access DT array 312 is established in PC with traditional data access instruction format. The DTCD-P 313 performs the process of data channel according to the access instruction, at the same time, the structure of source and destination data-tokens are implemented on the process of token of DT array 312. The structure of source data-token is controlled by the DTCD-P 313, and when the instruction WMD writes to DT area, the token in the same address is written (=1). The structure of destination data-token is controlled by the DTCD-P 313, and when the instruction RMD read from DT area, the token in the same address is tested. If the token is invalid (=0), the interruption signal 324 is sent to the CPU to process the PC program by interruption program for re-reading. Therefore the destination token really comprises the hardware of DTCD-P 313 and the interruption program. Naturally, the program of interruption is shared by each data-token, and it is transparent for user programming to enter the operating system. The instructions to access DT area for each processor are asynchronous, and performed by the internal structure of each unit.

The DCO data consistency instruction is established in the consistency flow-sequence Sc 311 to send an address (corresponding to an consistency token) simultaneously through the 317, and the consistency operation of a distributed token is designated overall. The same address in DT array 312 for each unit indicates a distributed data-token. The capacity of DT array corresponds to the maximum number of distributed data-tokens in the system, and the transmission channels for each distributed data-token share the DT bus 319. All DTCD-Xs 314 synchronously receive the information from the 317, then control the operation of data consistency, and perform the transmission from source data-token to destination data-token through the cooperation of among them on the DT bus 319.

Implementation of Sequence-Net Function in the Embodiment:

In FIGS. 2E and F, the sequence-net is driven by Sc&Pi independently, and the distributed data-tokens 250 are processed one by one sequentially. In the embodiment, N programs consist of the PC programs, and the "1" is implemented by the consistency flow-sequence Sc. The processes of source and destination token are performed by PC program during its access to the DT array 312. The Sc sends each global address and the time sequence trigger information (corresponding to the data consistency instruction) sequentially. The distributed data-tokens are defined by the address, and their consistency operations are performed one after another in the tempo of the shared clock.

The source data-token and destination data-token are a concept in the consistency operation of distributed data-token. For the programming, the distributed data-token is merely a data of model, and the process of data access is performed by the program only. Therefore, the invention builds a structure in which the establishment of source and destination tokens is performed by the operation mode of data access, and the operation for token is produced by the data-token module DTCD 310. Thus the concept of source and destination is masked for the user programming.

Accordingly, the users are allowed to not take the token into account in their programming work, and a better user programmable interface is built. The particular running procedure is as follows:

(1) When the PC program runs into the position of write module data, the module data are sent to the designated address in the local DT array, and the token bound with the address is designated as a source token to build source token=1 to show the validation of data;

(2) When the PC program runs into the position of read module data, it is programmed to designate an address in the local DT array and read the module data, at the same time, the token bound with the designated address is designated as a destination token for testing; if the destination token is invalid, an interruption (or waiting) is produced, then the process of re-read is performed by the interruption program to ensure the correctness of computing, and a destination token is built; and (3) In the invention, an interface between the consistency flow-sequence Sc 311 and the data-token module 310 is built. It is used as the simultaneous-transmission address input port 317 in simple structure form. Each new address issued represents an data consistency instruction, and the clock is used as the executive cycle of data consistency instruction.

When the data consistency instruction runs into a proper point, the data consistency operation is produced, then the DT array in all units is addressed with a same address, and the data and the token are simultaneously sent from "source" machine to "destination" machine through the DT bus 319 in a broadcast mode. During the transmission, the source token should be tested to confirm the validation of data transmitted; when there is no source token (source token is invalid), the run will waiting at this data consistency instruction until the source token appears.

In the distributed computation mode, the memory contents distributed in the same address in each DT array 312 are used to define a module data; thus the time difference of data consistency occurs. In the centralized shared memory structure, each system data have a corresponding physical memory addresses respectively. These feature results in that the conventional study target of data consistency is the elimination of time difference among the addresses in distributed memory array. However, in the invention, it is recognized that there must be a time difference in the distributed structure. Therefore, in contrast to elimination of the time difference, the time difference is used to establish the data consistency instruction to indicate the data consistency operation under the condition of ensuring the data correctness. Thus, it can be considered that the invention is not applicable for the centralized shared memory structure. (On the contrary, it is good for rising function in previous arts.)

The functions of data consistency instruction to control the tempo of parallel run in a sequence-net will be described in below:

The structure of data-token system supports the pause mode for overall run controlled by data consistency instruction. When a data consistency instruction is not executed, the token can not be obtained by read-data instruction in same address, so that any test for the destination token can not succeed. Thus, all the PC programs pause on their read-data instruction respectively. For the sequence-net, this is a overall run tempo control method in addition to the synchronous waiting method realized by a local read-data instruction (destination token) test from the PC.

Minimum instruction set for implementation of sequence-net function:

The sequence-net-function-based minimum token instruction set comprises three instructions: SO, DE, and CO.

After the approach to computer structure, a lot of new instructions should be generated due to the great capability of instruction expansion in the structure. The invention demonstrates that the most essential instructions type based on data description are three sequence-net data instructions described in FIG. 2E. They are as follows:

Read data instructions RMD

This is a new instruction in PC to represent the destination data-token. The instruction comprises the reading of address parameters in DT array 312 from PC and the reading of control signal, and a data transmission channel is established through the module DTCD-P 313. For the destination token, the token is tested, and the connection of the interruption of 324 in CPU is performed through the module DTCD-P 313. The interruption program handles the re-reading of RMD instruction.

Write data instruction WMD (originated from the source token instruction SO).

This is a new instruction in PC to represent the source data-token. The instruction comprises the writing of address parameters in DT array 312 and the writing of control signal, and the operation of data writing to DT array 312 is performed through the module DTCD-P 313. The token value T=1 written by source token is implemented by the module DTCD-P 313.

data Consistency instruction DCO

This is an instruction from the consistency flow-sequence Sc to represent the consistency token. The instruction comprises the address parameter in overall DT arrays 312 and the trigger time sequence, and the reading of source data-token, having a valid token is written into the source data-token in the distributed data-tokens.

The run format of instruction described above shows that the processes of write-data instruction, read-data instruction, and data consistency instruction are implemented by the hardware after the instructions are initiated. And the write-data and read-data instructions are operated locally, and the data consistency instruction is cooperated overall.

The sequence-net function description with minimum instruction set has been introduced in FIG. 2F, and not repeats in here.

From the viewpoint of overall programming, a distributed data-token 250 corresponds to a module data. Therefore, the system in FIG. 3A is a programming model of shared memory for DT data. In the system, the PC program accesses the modular data by means of their addresses and the sequence of module data (that is, sequence Sc) is provided by the user.

Figure 3B:
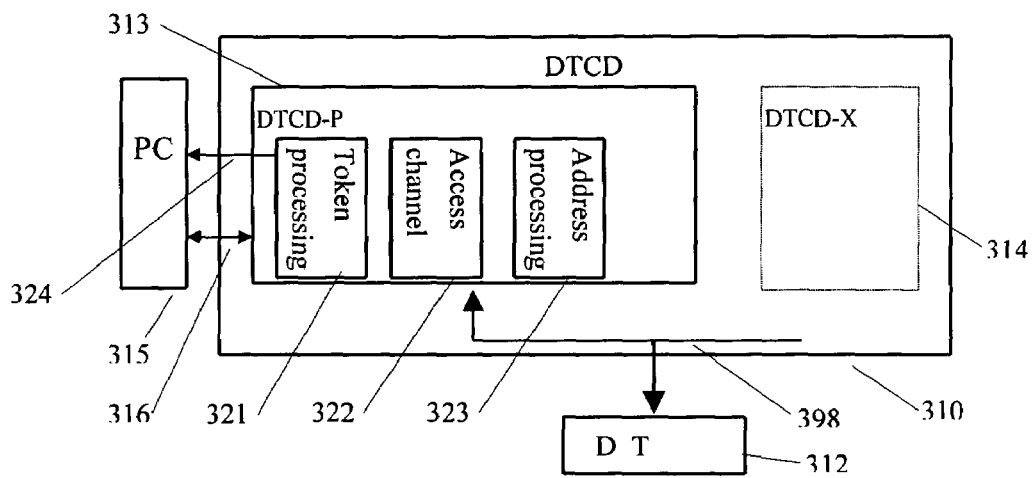
FIG. 3B is a data-token structure supporting the source and destination token.

FIG. 3B shows the support structure for source and destination data-tokens.

This is a local operation between PC 315 and data-token array DT array 312 through the module DTCD-P 313. It is functioned to perform the generation of source token and the test of destination token in sequence-net.

The module DTCD-P 313 comprises an address-processing module 323, an access-channel-processing module 322, and a token-processing module 321. In DTCD-P 313, the module 321 sends the interruption request signal 324 to the PC.

When the DTCD-P 313 receives a WMD instruction from the PC through the connection of bus 316, the access channel module 322 makes a proper process to the information (address, data, and write operation) from the PC through the bus 316, then they are transformed into address, data and write control, and the write data operation for DT array 312 is performed through the 398. Furthermore, the "1" signal is generated by the token-processing module 321 according to the WMD instruction, and written into DT array 312 as the value of token T. The address registration may be, or not be, performed by the address-processing module 323 depending on the different structure.

When the DTCD-P 313 receives a RMD instruction from the PC through the connection of bus 316, the access channel module 322 makes a control to transform to the information (address, data, and read operation) from the PC into address, data and read control in real-time, and the operations of read data and read token for DT array 312 are performed immediately through the 398. Furthermore the data are transferred to the data bus for the PC, and the values of token are sent to the token-processing module 321. When the module 321 receives the token value read from the DT array 312, the token is tested immediately. If the token is valid, the instruction will be ended, Otherwise, the interruption signal 324 is sent to the PC, the process after the test of destination token is performed by the interruption program.

Figure 3C:
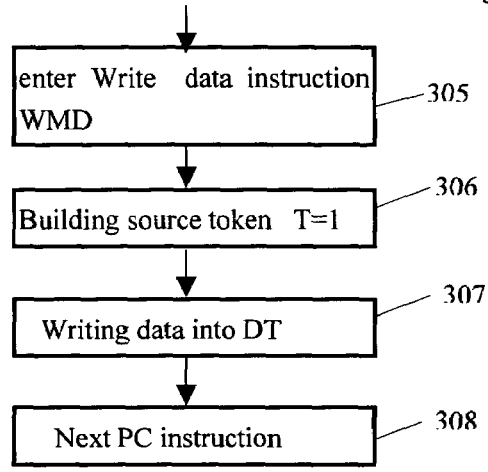
FIG. 3C is a WMD instruction flowchart.

The flowchart of instruction WMD is shown in FIG. 3C.

The PC writes the instruction WMD for DT array 312 to build a source data-token.

In the WMD instruction flowchart, the source token is built, In step 305, a write module data instruction WMD is entered, and the WMD instruction is received by the DTCD-P 313 in step 306 to build the operation of (write) token=1. Then the data are written into the data-token array 312 in step 307, and the instruction is ended in step 308.

Figure 3D:
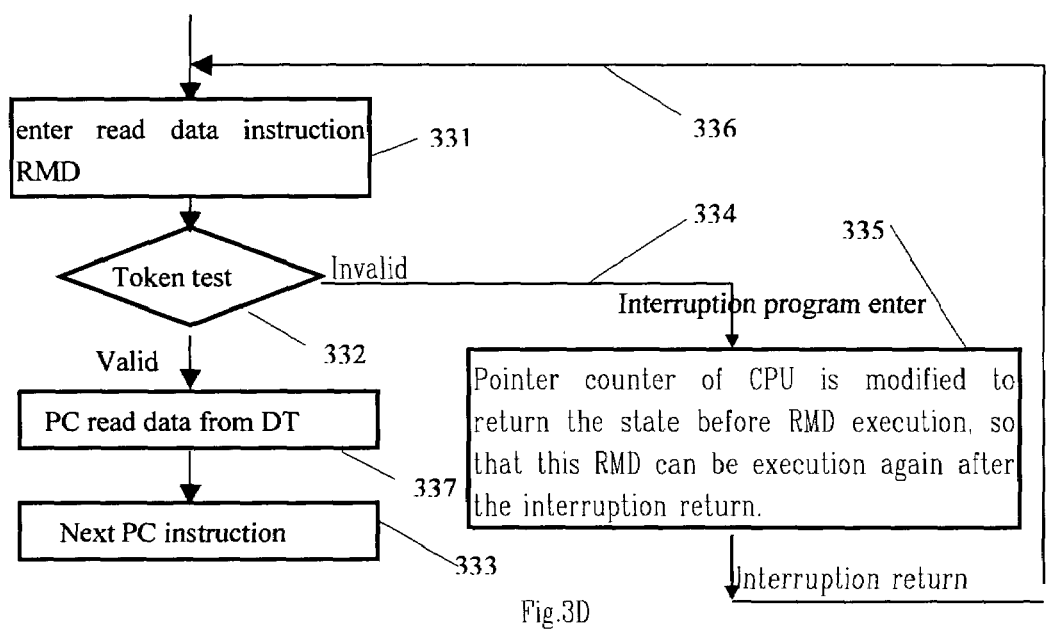
FIG. 3D is a RMD instruction flowchart.

The flowchart of instruction RMD is shown in FIG. 3D.

The PC reads the instruction RMD for DT array 312 and builds a test of token, which compose the interruption service program and create a destination token.

According to the principle shown in FIG. 2D, the program should continue only if the test of destination token is successful; Otherwise, the program should pause to wait a valid token. The measure which is capable of making a pause of computer program today are WAIT (or READY), INTERRUPT, and HOLD. Of course, the specific destination token pause measure will be built in future. In this embodiment, the interruption process in previous art is used in the description.

The RMD instruction flowchart comprises the test of destination token and the interruption service program. In step 331, a read module data instruction RMD for the PC is entered, and the RMD instruction is received by DTCD-P 313 in step 332. Then, while the data is read, the token read from the same address is tested. If the token is valid the flow enters to step 337 to implement the read data operation, and enter to next PC instruction in step 333. If the token is invalid, a hardware interruption 334 occurs. The step 335 brings the program to return to the RMD instruction that produces the interruption, thus the flow enter to step 331 to perform the re-read operation after the interruption program return 336.

Another method for the implementation of program synchronization in multi-PC is the wait signal in CPU, and yields the same result as that in the interruption method. In this method, the test result of token is connected to the wait signal. It is applicable for high-speed parallel computing with a speed higher than that in interruption method.

The object of interruption is to return the count number of instruction counter. Therefore, the steps 331, 332, and 335 can be implemented in one instruction without the entering to an interruption when the CPU can be re-design in the future.

Up to the above descriptions, two measures for supporting the practice of user programming on PC in the new architecture of the invention have be introduced:

(1) the memory structure with same address for data and token, and the token building and processing by "read/write operation" instruction of PC; and (2) the process of token invalidation with interruption program and the interruption process entering to the operating system domain without the need of user programming process.

They not only realize the design of source and destination data-tokens, but also eliminate the non-model parameter of token from the user programming on PC.

Figure 3E:
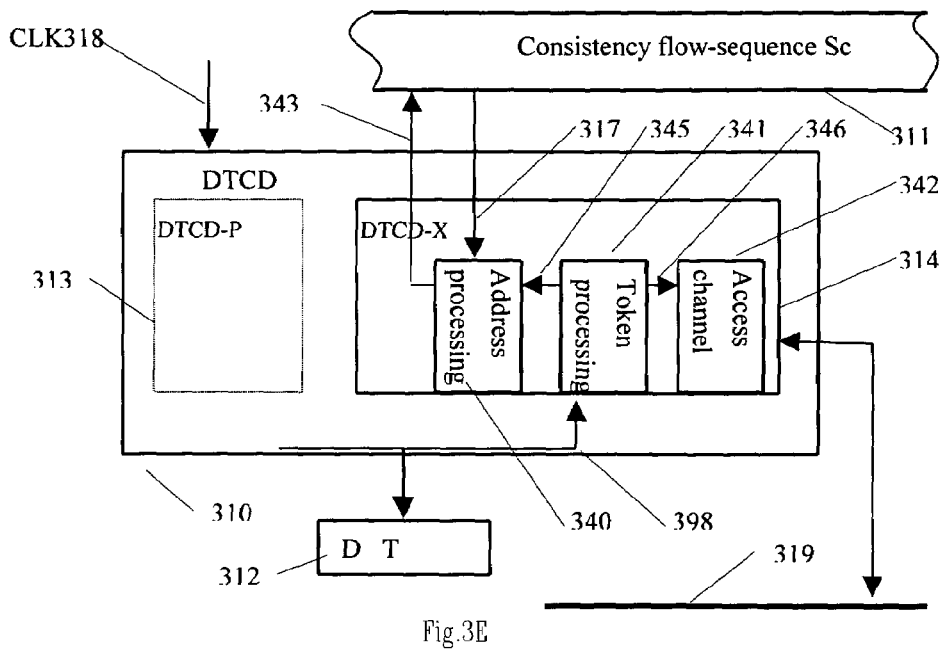
FIG. 3E is a structure supporting the data consistency instruction.

FIG. 3E shows the supporting structure for data consistency instruction operation.

The structure is the global operation among processors to transfer data and token from each DT array 312 through the DT bus 319, and is functioned to implement the consistency operation for data and token with same address in each DT array 312 global. FIG. 3 shows the structure of one unit, and the structure of every unit is the same.

The structure of consistency operation comprises the DT bus 319 and the module DTCD-X 314 and the DT array 312 in each unit module. The DT bus 319 comprises a data bus and a token bus. The module DTCD-X 314 in each unit comprises the address-processing module 340, the access-channel-processing module 342, and the token-processing module 341. The test signals 345 and 346 are sent from the token-processing module 341 to the address-processing module 340 and the access-channel-processing module 342.

The consistency operation for data-token is an global operation initiated by the data consistency instruction. However, the global operation is controlled by overall DTCD-Xs 314 respectively to perform the cooperation of overall units. In particular, it is a cooperation way that the data access (write/read data for) to the bus 319 is independently controlled by each DTCD-X 314, at the same time, each DTCD-X 314 performs a read operation or write operation to its DT array 312 respectively. Depending on the correlation among these read or write operation, the consistency transmission of data-token from the source to the destination is realized, and the consistency operation within the consistency data-token 250 in FIG. 2F can be achieved.

The success of data consistency instruction operation refers to the validation of the token in a consistency transmission. Therefore, during the broadcast, a test of information on T bus in bus 319 should be performed by each DTCD-X 314 independently. And only valid token results from the test, the data consistency instruction is ended by each DTCD-X 314, then the entering of next data consistency instruction is handled by the consistency flow-sequence Sc.

Because the operating mode on DT bus 319 is different from the traditional bus-master and bus-slave mode, the distributed control cooperation mode in the invention requires a more strict synchronization. In the structure of the invention, besides the shared information, a shared clock CLK 318 is sent to each DTCD-X 314 respectively.

When an address issued by the DCO instruction from consistency flow-sequence 311 is received simultaneously by all DTCD-X modules 314, the address parameters in instruction DCO are latched by the address-processing module 340, and the overall data-token consistency operation for an data consistency instruction begins. There are two steps in the procedure of consistency operation. In the first step, the address is sent to the DT array 312 by the address-processing module 340 through the 398 to perform the read operation, and the token signal read is sent to the access channel module 341 while the data is sent to the access channel module 342. After a local token information is received, the token-processing module 341 makes a determination. If the token is invalid, the information 346=0 that represents the local unit is a destination machine will be sent to the access channel module 342; if the token is valid, the information 346=1 that represents the local unit is a source machine will be sent to the module 342.

In the second step, the access channel module 342 makes the control. If a source machine presents, the data-token read from DT array 312 in the first step will be sent to the DT bus 319; otherwise, a data-token will be read from DT bus 319, and passed through the access channel module 342 to add a write operation control, then sent to the DT array module 312. At the same time, the overall token T read from DT bus 319 is sent to the token-processing module 341. The token-processing module 341 determines the token value from T bus immediately. If T=1, the data consistency instruction is valid, then ended, and the consistency flow-sequence Sc 311 is informed by the address-processing module 340 through the 343 that the address-processing module is idle. If T=0, the data consistency instruction is invalid, the operation should be repeated until T=1.

In the whole procedure of consistency operation, the address output from address-processing module 340 is constant, and the DTCD-X 314 in each unit is operating independently, but a well cooperation can be obtained. The reason for this ideal result lies in the fact that the first step starts from the synchronous initiation of DCO instruction of Sc, and the results of determination and processing in second step are unified since the overall T signals of the bus are unified. In addition, the shared clock CLK 318 is the key that brings a unified operating tempo for all DTCD-Xs.

Figure 3F:
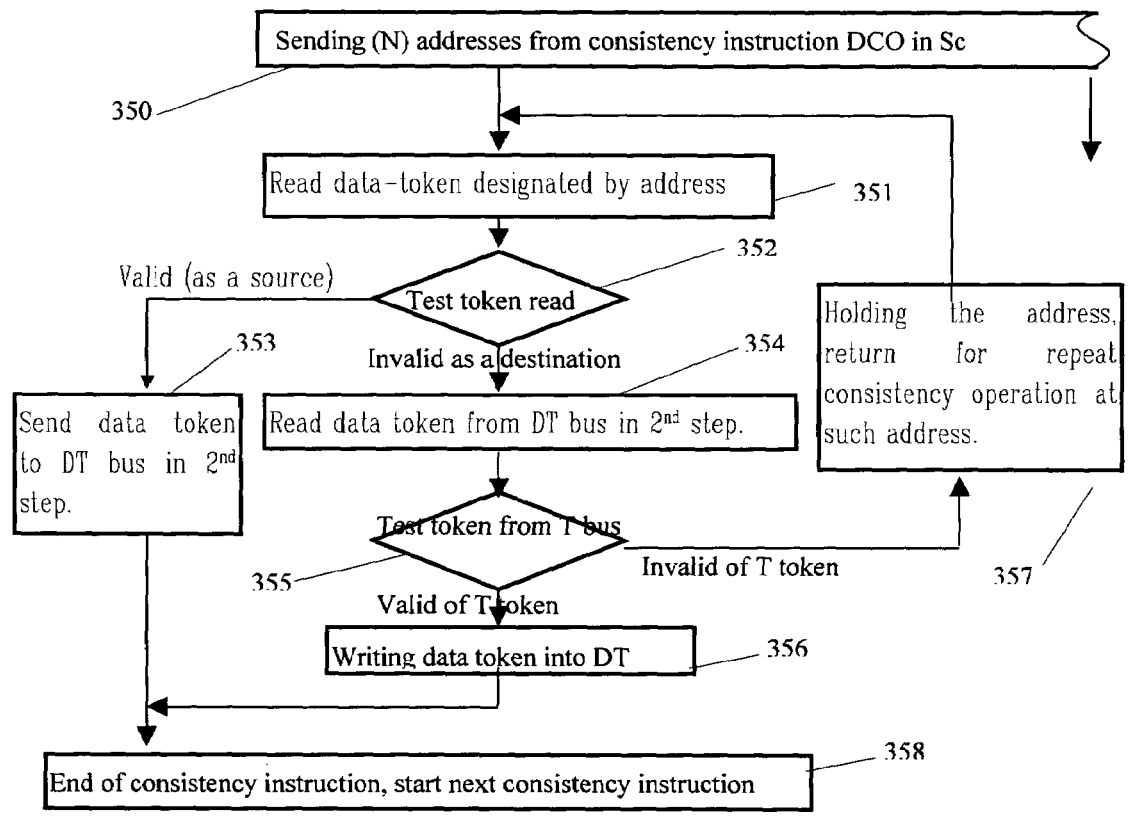
FIG. 3F is a DCO instruction flowchart.

FIG. 3F is a flowchart for DCO instruction.

Only the operating flow of one unit is shown since the flow is same for each unit.

In step 350, there is a data consistency instruction DCO. It sends a consistency token as seeing from the viewpoint of sequence-net. The DCO issues the overall shared addresses to signet a data-token, and initiate the consistency operation. In step 351, according to the input address, each unit produces itself an operation to read DT array 312 to obtain the data and token corresponding to such address. The data are stored as a back up, and the token enters to step 352 for testing. The test result is used to define the source or destination for consistency through the overall cooperation in second step. The step 353 is the branch of step 352 when the token tested is valid, and makes the unit as a source in the second step of procedure. For the source operation in a consistency operation, the data stored and the token T (=1) are sent to the DT bus 319, then the operation enters to step 358 to end the consistency instruction. The step 354 is the another branch of step 352 when the token tested is invalid, and makes the unit as a destination in the second step of procedure. For the destination operation in a consistency operation, the data and token are read from the DT bus 319, then the operation enters to step 355 to test the token read. The test results further produce two branches. The step 356 is one of the branches of step 355 when the test in it is valid, and shows that the source machine exists, the run of consistency is correct, thus the data and token (=1) read should be written into a DT array 312 in the unit, then the operation enters to step 358 to end the consistency instruction. The step 357 is the another branch of step 355 when the test in it is invalid. This test result shows that there is no source machine in all units, and this cycle of consistency operation is idle, then a repeated consistency is required. Therefore, the same address is held, the Sc is informed the rejection of next data consistency instruction DCO, and the overall units enter to step 351 to start another consistency operation cycle of the same consistency instruction. Thus, the number of consistency operation cycle is undefinable.

The N+1 flow-sequences in the invention are characterized by the ability of instruction-capable—a significant difference to N+1 flow-sequences in previous art. The description environment of sequence-net represents an independent and separative flow-sequence environment. This is just the cause to the effect of instruction-capable consistency token. In FIGS. 3G-FIG. 3I below, the data instruction execution procedure of sequence-net will be further described with the instruction parameters and their transformations to provide a more clear structure character of invention.

FIG. 3G shows the parameters of read module data instruction RMD for the PC.

For the PC programming, the RMD instruction is functioned to read the valid data from local DT array 312. And input to the register or the internal memory designated by the PC instruction. The CPU is hard to change. Under this condition, the conventional bus read data format can be used only. As shown in FIG. 3G, the bus information output from RMD instruction comprises an address for addressing the DT array 312, the data read from DT array 312, and the control mode indicated as "read". These signals are received by the DTCD-P module 313, and transformed into a particular execution information.

The operations of RMD instruction in DTCD-P 313 are divided into two parts: the data operation and the token operation. In the data operation, the instruction information are transformed into the address, data, and read control information in the DT array 312 with their original form, and executed. In the token operation, the address is used for addressing and reading the token, and the read signal in the instruction is translated into the destination token information, while it performs the reading of data and token. For the operation of destination token information, the read-in token is tested, and the operation enters to the interruption for re-read process performed by the interruption program when the token value resulted from the test=0.

The FIG. 3H shows the parameters of write module data instruction.

For the PC programming, the WMD instruction is functioned to write the data output from PC into the memory in DT array 312 and to set a data validation flag. The conventional bus write data format can be used only, because the CPU is hared to change. As shown in FIG. 3H, the bus information output from WMD instruction comprises an address for addressing the DT array 312, the data sent from PC, and a control mode indicated as "write", These signals are received by the DTCD-P 313, and transformed into a particular execution information.

The operation of WMD instruction in DTCD-P is divided into two parts: the data operation and the token operation. In the data operation, the instruction information are transformed into the address, the data, and the write control signal in the DT array with their original form, and executed. In the token operation, the address is used for addressing and writing the token, and the write signal in the instruction is translated into the source token information, while it performs the writing of data-token. The operation of source data-token writes the token value (=1).

FIG. 3I shows the parameters of overall module data consistency instruction DCO.

As shown in FIG. 3I, for the interconnection information to the programming interface, the instruction DCO only comprises an address information for addressing the DT array 312 and defining the distributed data-token to perform the consistency. This address information is received by each DTCD-X module 314, and transformed into a particular execution information respectively. The type of source machine for consistency operation of DCO is also implicated in fact. In the embodiment, the implicit source unit (data) are determined by the validation bit (=1) in token.

According to the invention, in the data-token consistency operation defined by the (implicit) source type, the operation flow each DTCD-X 314 comprises two steps. In the first step, as shown in FIG. 3I, the operations of read data and token test are produced by each DTCD-X 314. The read-in data are stored temporarily. The read-in tokens are tested respectively for their validation, and the source or the destination is defined for the consistency operation in the second step according to the test result. During this period, the overall address information is used for addressing. In the second step, the consistency transmission is performed. If a source is defined in the first step, the DTCD-X 314 performs a control to send the data-token to the DT bus 319. If a destination is defined in the first step, the DTCD-X 314 performs a control to receive the data-token from the DT bus 319, and produces the operation of write data-token by the addressing for overall address, as shown in FIG. 3I. Meanwhile, the token represented the overall information from the T bus is tested again in the second step. This overall information corresponds to the same token value that can be received by each DTCD-X 314 to show the presence or absence of a source machine in this consistency operation as a flag for determining the success of data-token consistency. As shown in FIG. 3I, based on the result of further test, the repeat or end of the consistency operation is determined by every DTCD-X 314.

In the invention, the structure such as DT array locating, instruction expanding, module insertion on PC bus, destination token implementation with interruption are implemented on the computer structure in previous art. For those skilled in CPU chip design and computer design, it is apparent that based on the principle in the invention, the change may be made at the connecting position of each component and the computer, for example, the DT array is established in CATCH layer, the instruction expanding is implemented directly in the CPU.

Although the structure of consistency flow-sequence Sc 311 represents a very low requirement for the novel N+1st consistency flow-sequence in the parallel module in sequence-net, the invention recognizes that it is necessary to develop the flow-sequence structure into a program structure, that is, to make the consistency flow-sequence into the program structure, for providing the flexile programmable capability for adaptability improvement. In application, the static and regular consistency flow-sequence Sc is transformed into dynamic and changeable consistency program, which highly develop adaptability between model and computer. And the same time, introducing consistency program support the characteristic of package of sequence-net and capable of interrupt.

To establish a structure having both distributed character and consistency flow-sequence of single program feature, the art of a previous invention (China patent No. 86106695, U.S. Pat. No. 4,975,834) (that is, cell-computer technology for brief in below) is associated herein to enhance the programmability of the consistency flow-sequence Sc, and yields the preferred embodiment of the invention as the structure shown in FIG. 4A.

As previous description, the embodiment insists on the characteristic that N homogenous module produce N+1 programs.

Figure 4A:
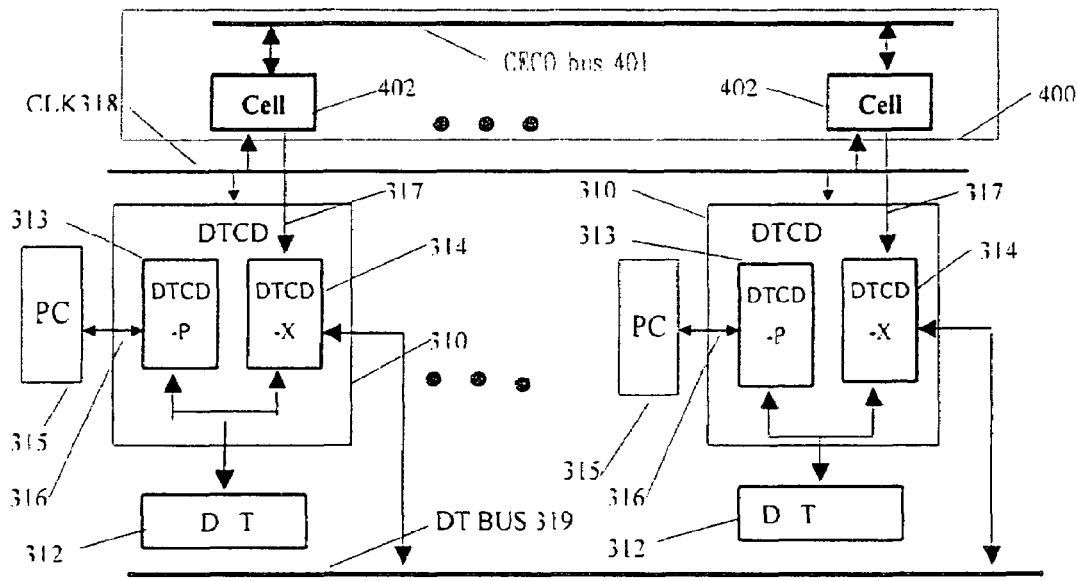
FIG. 4A is a preferred embodiment structure of the invention.

FIG. 4A shows the structure of a preferred embodiment in the invention.

The embodiment is a combination of the structure shown in FIG. 3A and the cell-computer technology. In this new structure, the subsystem 400 comprising N cells is used to replace the Sc 311 in FIG. 3A. Each cell 402 is connected to a DTCD module 310 through the 317, and shares a clock 318. The functions of this structure are divided into two parts. The function of sending data consistency instruction from consistency flow-sequence Sc 311 is performed by the subsystem 400 to initiate an data consistency instruction as the consistency flow-sequence Sc and sent it to DTCD 310 through 317. Then the data-token consistency function of distributed data-token is performed by the structure shown in FIG. 3A.

The CECO instruction particular to the cell-computer in previous invention issues a control to send a series of ordered data to use as the input address sequence for the data-token control module DTCD 310. The address sequence enters to DTCD-X 314 through the 317. The parallel transmissions in same tempo from each cell 402 can be controlled by CECO instruction so that the address parameter can be received by each DTCD-X 314 in parallel. Thus, each time an address parameter is transmitted, an operation of module data-token consistency, corresponding to a data consistency instruction, is initiated.

From the viewpoint of sequence-net, the cooperation of cell-computer 400 with distributed structure can be fully functioned as an consistency flow-sequence Sc, and the capabilities of compilation and scheduling in the Pcon program comprised of CECO instruction can support the development of Sc to meet the needs of various complicated application. As a comparison to the single-processor program, the Pcon maintains the structure mode in single-processor program, and comprises the program characters, such as "call" "jump", "embedding", and "interruption", enough to provide the simple ordering character required by the consistency flow-sequence Sc in sequence-net.

In the invention, the object of the introduction of cell-computer technology is to establish a program structure with distributed construction and serial operation. It not only can meet the function requirement of consistency flow-sequence Sc from sequence-net in structure, but also can facilitate the development from simple flow-sequence Sc structure to programmable Pcon structure.

The structure for sending address sequence from the cell through the 317 is various. The mode of direct address sequence output to data-token system may be used. Alternatively, the external device sending mode with its output through IO transformation port may be used.

Figure 4B:
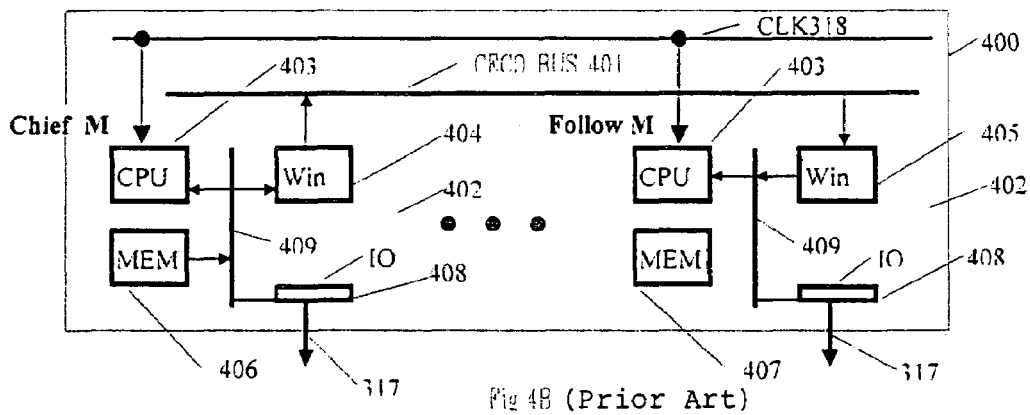
FIG. 4B shows the principle of cell-computer in previous invention.

FIG. 4B shows the principle of cell-computer in previous invention schematically.

For easy understanding of the invention, the principle of cell-computer in previous invention will be described briefly in below.

The cell-computer is a system comprising a plurality of isomorphic cell modules 402 interconnected by the CECO bus 401. Each cell module comprises a CPU module 403, a local internal memory module 406 (407), a window module 404 (405) connected to the CECO bus 401, and a local expandable interface module 408. The modules are interconnected by a conventional computer bus 409, and a clock CLK 318 is shared by each cell module 402.

The cell-computer system in previous invention supports a unique serial CECO (multi-machine) instruction and program with a distributed structure. The system is characterized in that.

(1) A CECO program code is shared by a plurality of CPUs 403.

(2) The machine codes of the CECO program are resides in the internal memory in only a computer module (for example, 406); and (3) The user should write a serial CECO program.

Now, the principle of a cell-computer system in previous invention will be described. In a system based on the connection with CECO bus 401, the external level designates one module 402 as a chief machine (as shown in FIG. 4B), and the remainders are the follower machines. Each CPU 403 operates the CECO instruction reformed from original single-processor instruction at the layer of a machine cycle of the instruction in a synchronous state.

The regulation for instruction reformation is that During a machine cycle of the instruction, every CPU 403 shares the byte resulted from the addressing of instruction counter in chief machine. This is the regulation for instruction reformation. In FIG. 4B, the running path of the byte addressed is shown that the byte is read from the memory 406 in chief machine, and sent to the CPU 403 in chief machine, and enter to the widows 405 in every follower machine through the widow 404 in chief machine and the CECO bus 401, and inputs to the CPU 403 in follower machine.

Owing to the regulation for instruction reformation, the byte addressed by the instruction counter in chief machine is shared in structure for the cell-computer. This measure is just the measure required in the sequence-net, in which the structure is distributed, and the operation is controlled by a serial program. In the invention, the object of the introduction of the CECO instruction is to establish a program structure with distributed construction and serial driving flow. It not only can meet the function requirement of consistency flow-sequence Sc from sequence-net in structure, but also can facilitate the development of Sc from simple flow-sequence structure to programmable Pcon structure.

Figure 4C:
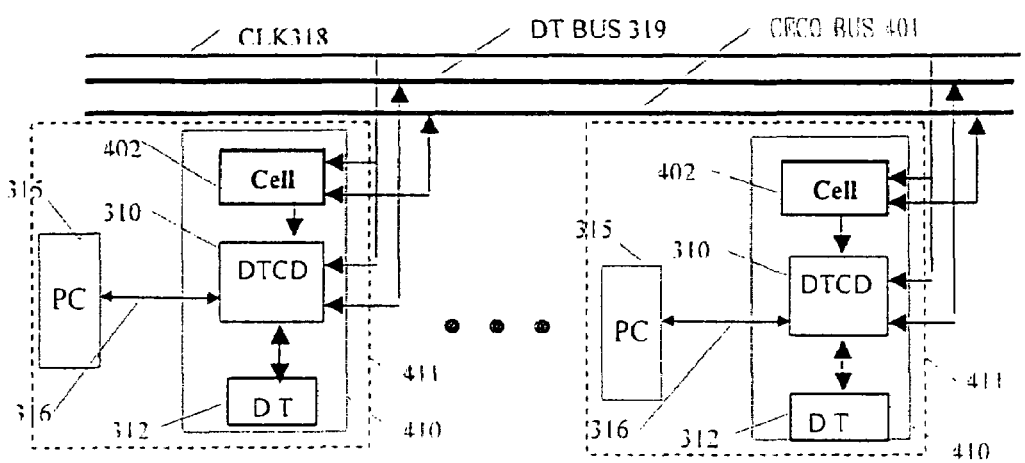
FIG. 4C is another representation of the preferred embodiment in FIG. 4A.

FIG. 4C shows the another representation of the preferred embodiment in FIG. 4A.

In FIG. 4C, the arrangement and reference number are consistent with those in FIG. 4A. However, two characters of structure module in this embodiment will be emphasized in the description.

(1) N distributed modules 410 are isomorphic.

They share a clock CLK318, and are interconnected with the CECO bus 401 and the DT bus 319. Furthermore, they are connected to a local computer (for example, PC) respectively. The module 410 comprises a cell 402, a data-token control DTCD 310, and a data-token DT array 312.

The practical application structure is fully illustrated in FIG. 4C. The module 410 can be a card inserted to the PC, or through the PC bus 316, for example, to connect to the PC. For the PC, the bus 316 may be an ISA bus, a PCI bus, or a catch memory bus. After N cards 410 are connected to N of PC 315, a new bus (the combination of 401 and 319) is used to each interconnected among N cards. A shared clock 318 connected to each card 410.

This simplest structure is almost similar to the conventional interconnection card and the likes in its appearance. However, it has N+1 program flows, it comprising one program flow Pcon (instead of Sc) formed by the cooperation of N cells 402, N program flows Pi, and the functions for data-token process. Furthermore, the operating of parallel modules with sequence-net mode in the invention can be implemented in it.

It is apparent to those skilled in the art that the parallel bus (the combination of 401 and 319) shown in the invention can be transformed into the serial bus to reduce the number of connections. In the serial-bus mode, the overall system is still provided with the "N+1" parallel modules structure in sequence-net, and the design and implementation are viable for it with current art.

The homogenous of the module 410 is also shown in the embodiment, Thus, the module is suitable for integrating at the chip level, and the cost performance ratio in the invention will be improved with the development of IC chip technology.

(2) Owing to the development of ULSI technology, the success of single chip integrated overall PC is nearing. For the another expectation in the invention, the module 410 and the PC 315 will be integrated in one chip to form the module 411. In this single chip module, the module 410 will be combined with the single chip PC in a very small area on it so that the single chip PC will be provided with the standard multiple PC expansion port and the numerical sequence resource, and the external pins in the chip will be reduced. Furthermore, when the new single-chip structure is directly implemented on a silicon wafer, the automatic test on a production line will be realized by using the multiprocessor structure of this invention.

The simple single-chip processor is popular today. For the another application expectation in the invention, the internal structure of single-chip processor such as 8051 will be reached so that a convenient, low cost and high efficiency multiple single-chip processor system can be built. Thus only one type of single-chip processor will be added to expand regardless of the requirement of increase in IO interface, memory, or parallelism.

Expansion of Instruction System in the Invention:

The instruction used to be the easiest expanded layer in the computer structure. One of the advantages of sequence-net computer structure is the control layer built on the instruction layer in computer. Therefore, the expansion of instruction set occurs naturally. The sequence-net instruction set of the invention has two types. that is, the instruction of PC and the instruction of Cell-computer.

According to the principle of the invention, the embodiment illustrated in FIGS. 2A, B and C shows three sequence-net token instructions: CO, SO, and DE. These instructions represents a minimum sequence-net instruction set based on token. In the embodiment illustrated in FIGS. 2D, E and F, three sequence-net data-token instructions: DCO, DSO, and DDE are showed. These instructions represents a minimum sequence-net instruction set based on data-token. They are further transformed into three sequence-net data instructions in data format: RMD, WMD, and DCO. These instructions represent a minimum sequence-net data instruction set suitable to modeling. In these three instructions, two instructions are the expansion of PC instruction set, and one instruction is the expansion of CECO instruction set. It should be pointed out that the new sequence-net instruction set expanded of the invention in the future will be based on and includes the minimum instruction set described above.

Expansion of PC Instructions:

The expansion of PC instructions may refer to the related parameters shown in FIG. 3G. They comprise the address aspect, the token type aspect, and the read/write explanation aspect.

In the address aspect, the instructions allowing PC to perform continuous read/write operation in batches will be established.

In the token type aspect, the new instructions will be established through the expansion of token number and interruption type.

For example, the amount of token is expanded to establish an overall data control type in which the read only can be performed after the consistency operation has been performed.

In the read/write explanation aspect.

For example, the operation of reading DT array 312 for PC can be defined as a source token So that accompanying with a token validation (=1) structure, the "read" operation will become the source in data-token consistency operation.

Furthermore, the expansion of PC instructions includes the read/write made without token test (that is, the token test is passed forever).

For those skilled in the art, there is no difficulty to expand the instructions, and the development of new type can be done well. In the invention, it should be noted that any new expanded instruction set for PC should comprise the basic type of sequence-net instructions DE, SO, or DDE, DSO, or sequence-net data instructions RMD, WMD as set forth in the invention, and the mayor part of expanded instruction should to represented as a data read/write format without token parameters at the PC programming interface.

Expansion of Consistency Instruction:

The expansion of consistency instruction may refer to the related parameters shown in FIG. 3I. They comprise the address aspect and the source type aspect for consistency instruction. In the address aspect, the consistency instruction for continuous batch address or non-continuous batch address will be established. In the source type aspect, the source type in data-token consistency operation will be expanded so that the definition of source will become a dual constraint mode with "token validation X additional condition for source".

The expansion type of consistency instruction shown in FIG. 5 will be described in below.

The process of batch data-token consistency

For example, a batch processing comprising the information of "initial address" and "length" will be established.

For the structure in it, the structure with "continuous address+I" and the control-length computation structure will be built by the hardware in the address-processing module 340 in accordance with the initial address and the length.

The implicit (data-token) source belongs to the type, and it is unique, but it is not marked in the instruction parameters. On the contrary, the explicit (data-token) source is indicated in the parameters of consistency instruction; thus it can be expanded substantially. In the invention, the format for the explicit (data-token) source is as follows:

"Valid Token X Additional Conditions for Source"

In this format, based on the token value=1, the new condition is added (by logic "AND or OR" operation) so that the instruction can be expanded in its parameters.

The additional condition for the explicit source type is as follows:

the correlation between address and machine number is used as a source condition;

the correlation between length and machine number is used as a source condition;

the machine number designated by software is used as a source condition; and on condition that the plurality source exists.

The other relations of function are used as the source condition.

The expansion of consistency instruction further comprises the consistency transmission without token test (that is, the token test is passed forever).

For those skilled in the art, there is no difficulty to expand the consistency instructions, and the development of new type can be done well. In the invention, it should be noted that any new expanded instruction set of consistency instruction should comprise the basic type of sequence-net instructions CO or DCO as set forth in the invention, and the major part of expanded instructions should be represented as a data consistency format without token parameters at the Pcon programming interface.

The detailed description of the invention has been set forth through the embodiments. It will be apparent to all skilled in the art that various changes and modifications of these embodiments can be made without deporting from the spirit and range of the invention.

The invention claimed is:

1. A parallel processing module stored in a computer readable medium, the module having N (N>1) flow-sequences, each of said flow-sequences having a plurality of source tokens and destination tokens, said module comprising:

a consistency flow-sequence having at least one consistency token for building a distributed token structure together with at least one of said source tokens and at least one of said destination tokens corresponding to said at least said one source token in said N flow-sequences; and said distributed token structure being controlled by said at least one consistency token resided in said distributed token to perform a consistency operation, and when the source token value in said distributed token structure is invalid, said consistency flow-sequence being controlled by said consistency token at waiting status, and when the source token value in said distributed token structure is valid, said destination token value in said distributed token structure being valid;

wherein the source token and destination token in said flow-sequence are idle tokens that selectively are transformed into the source token or the destination token when said flow-sequence runs into a position where any one of the source token and the destination token is set and said distributed token is tested by said consistency token, and said consistency token is held at a waiting status when the tokens are idle tokens and/or no source token exists in distributed token.

2. A parallel processing module stored in a computer readable medium, the module having N(N>1) flow-sequences, each of said flow-sequences having a plurality of source tokens and destination tokens, said module comprising:

a consistency flow-sequence having at least one consistency token for building a distributed token structure together with at least one of said source tokens and at least one of said destination tokens corresponding to said at least said one source token in said N flow-sequences; and said distributed token structure being controlled by said at least one consistency token resided in said distributed token to perform a consistency operation, and when the source token value in said distributed token structure is invalid, said consistency flow-sequence being controlled by said consistency token at waiting status, and when the source token value in said distributed token structure is valid, said destination token value in said distributed token structure being valid;

wherein said source token comprises data to form a source data-token, said destination token comprises data to form a destination data-token, and the distributed token has at least one of said consistency tokens at least one of said source data-tokens, and a plurality of said destination data-tokens, said distributed token is tested by said consistency token, said consistency token waits when an invalid value of said source data-token results from the test, and the data in said source data-token is transferred to the destination data-token and the token value of the destination token is valid when a valid value of said source data-token results from the test.

3. The parallel processing module recited in claim 2, wherein said source data-token and said destination data-token are idle data-tokens for building a distributed idle data-token together with said consistency token, and said idle data-token is transformed into a source data-token or a destination data-token when said flow-sequence runs to a position where any one of the source token and the destination token is set.

4. The parallel processing module recited in claim 2, wherein the consistency token in said consistency flow-sequence comprises data consistency instruction, the source data-token in said flow-sequence comprises write data instruction, and the destination data-token in said flow-sequence comprises read data instruction.

5. A parallel processing method used with a parallel processing module stored in a computer readable medium, the module having N (N>1) flow-sequences, wherein each flow-sequence comprises a plurality of source tokens and destination tokens, said module comprising a consistency flow-sequence having consistency tokens for building a distributed token together with a source token and at least one of said destination tokens corresponding to said at least one source token in said N flow-sequences, said parallel processing method comprising the following steps:

1) executing each said flow-sequence independently and the source token value being valid when said flow-sequence runs into the source token;

2) executing said consistency flow-sequence at the same time of executing said flow-sequence;

3) controlling said distributed token with said consistency token resided to perform consistency operation when said consistency flow-sequence runs into said consistency token;

4) controlling said consistency flow-sequence with said consistency token for waiting when the source token value in said distributed token is invalid and said destination token value in said distributed token being valid when said source token value in said distributed token is valid; and 5) determining whether said destination token value is valid when said flow-sequence runs into said destination token:

5.1) if the destination token value is invalid, said flow-sequence does not run until said destination token value is valid;

5.2) if the destination token value is valid, said flow-sequence continuously runs:

wherein the source token and the destination token in said flow-sequence are idle tokens, and said idle tokens are transformed into the source token or the destination token when said flow-sequence runs into a position where any one of the source token and the destination token is set, and said distributed token is tested by said consistency token, and said consistency token is held at a waiting status when the tokens in said flow-sequence are idle tokens.

6. A parallel processing method used with a parallel processing module stored in a computer readable medium, the module having N (N>1) flow-sequences, wherein each flow-sequence comprises a plurality of source tokens and destination tokens, said module comprising a consistency flow-sequence having consistency tokens for building a distributed token together with a source token and at least one of said destination tokens corresponding to said at least one source token in said N flow-sequences, said parallel processing method comprising the following steps:

1) executing each said flow-sequence independently and the source token value being valid when said flow-sequence runs into the source token;

2) executing said consistency flow-sequence at the same time of executing said flow-sequence;

3) controlling said distributed token with said consistency token resided to perform consistency operation when said consistency flow-sequence runs into said consistency token;

4) controlling said consistency flow-sequence with said consistency token for waiting when the source token value in said distributed token is invalid, and said destination token value in said distributed token value being valid when said source token value in said distributed token is valid; and 5) determining whether said destination token value is valid when said flow-sequence runs into said destination token:

5.1) if the destination token value is invalid, said flow-sequence does not run until said destination token value is valid;

5.2) if the destination token value is valid, said flow-sequence continuously runs:

wherein said source token comprises data to form a source data-token, said destination token comprises data to form a destination data-token, and the distributed token comprises at least one of said consistency tokens, at least one of said source data-tokens, and a plurality of said destination data-tokens, said distributed token is tested by said consistency token, and said consistency token waits when an invalid value of said source data-token results from the test while the data in said source data-token are transferred to the destination data-token and the token value of the destination token is valid when a valid value of said source data-token results from the test.

7. A parallel processing method used with a parallel processing module stored in a computer readable medium, the module having N (N>1) flow-sequences, wherein each sequence comprises a plurality of source tokens and destination tokens, said module comprising a consistency flow-sequence having consistency tokens for building a distributed token together with a source token and at least one of said destination tokens corresponding to said at least one source token in said N flow-sequences, said parallel processing method comprising the following steps:

1) executing each said flow-sequence independently and the source token value being valid when said flow-sequence runs into the source token;
2) executing said consistency flow-sequence at the same time of executing said flow-sequence;
3) controlling said distributed token with said consistence token resided to perform consistency operation when said consistency flow-sequence runs into said consistency token;
4) controlling said consistency flow-sequence with said consistency token for waiting when the source token value in said distributed token is invalid, and said destination token value in said distributed token being valid when said source token value in said distributed token is valid; and
5) determining whether said destination token value is valid when said flow-sequence runs into said destination token:
   5.1) if the destination token value is invalid, said flow-sequence does not run until said destination token value is valid;
   5.2) if the destination token value is valid, said flow-sequence continuously runs:
wherein said source token comprises data to form a source data-token, said destination token comprises data to form a destination data-token, and the distributed token comprises at least one of said consistency tokens, at least one of said source data-tokens, and a plurality of said destination data-tokens, said source data-token and said destination data-token are idle data-tokens for building a distributed idle data-token together with said at least one consistency token, and said idle data-token is transformed into source data-token or destination data-token when said flow-sequence runs to a position where any one of the source token and the destination token is set.

8. A parallel processing method used with a parallel processing module stored in a computer readable medium, the module having N (N>1) flow-sequences, wherein each sequence comprises a plurality of source tokens and destination tokens, said module comprising a consistency flow-sequence having consistency tokens for building a distributed token together with a source token and at least one of said destination tokens corresponding to said at least one source token in said N flow-sequences, said parallel processing method comprising the following steps:
1) executing each said flow-sequence independently and the source token value being valid when said flow-sequence runs into the source token;
2) executing said consistency flow-sequence at the same time of executing said flow-sequence;
3) controlling said distributed token with said consistency token resided to perform consistency operation when said consistency flow-sequence runs into said consistency token;
4) controlling said consistency flow-sequence with said consistency token for waiting when the source token value in said distributed token is invalid, and said destination token value in said distributed token being valid when said source token value in said distributed token is valid; and
5) determining whether said destination token value is valid when said flow-sequence runs into said destination token:
   5.1) if the destination token value is invalid, said flow-sequence does not run until said destination token value is valid;
   5.2) if the destination token value is valid, said flow-sequence continuously runs:
wherein said source token comprises data to form a source data-token, said destination token comprises data to form a destination data-token, and the distributed token comprises at least one of said consistency tokens, at least one of said source data-tokens, and a plurality of said destination data-tokens, and the consistency token in said consistency flow-sequence comprises data consistency instruction, the source data-token in said flow-sequence comprises write data instruction, and the destination data-token in said flow-sequence comprises read data instruction.

9. A parallel processing module having N (N>1) unit modules, a consistency flow-sequence, and a data-token bus, wherein each of said unit modules is connected with said data-token bus and the consistency flow-sequence through consistency flow-sequence interface in the module, each of said unit modules comprising a computer, data-token control modules and data-token arrays, said computer connecting with data-token arrays via a computer connecting device in said data-token control module and performing reading and writing operation of said data-token arrays via said data-token control module, said consistency flow-sequence being connected with a multi-computer connecting device in said data-token control module to transmit data and tokens via said data-token bus to realize data-token consistency operation among N unit modules, said data-token array comprising data bits and token bits and said consistency token sent by consistency flow-sequence comprising a trigger time sequence and a data-token address.

10. The parallel processing module recited in claim 9, wherein the data is transmitted into an address specified in a local data-token array while a source token that owns the same address is created to present that said data is valid when said computer runs to write data instruction.

11. The parallel processing module recited in claim 10, wherein said consistency flow-sequence sends a consistency token that comprises trigger time sequence and address of data-token to a multi-computer connecting device when said consistency flow-sequence runs to a data consistency instruction, said data-token arrays in said unit module being addressed by the same data-token address, and the data and token in this data-token array broadcast to all the data-token arrays of said unit module via data-token bus when said source token is valid.

12. The parallel processing module recited in claim 11, wherein the data in the local data-token array is read when said computer runs to read data instruction, the destination token which owns the same address is created to present that said destination token is tested, and if said destination token is invalid, said computer waiting or re-reading this destination token.

13. The parallel processing module recited in claim 9, wherein said consistency flow-sequence has N cell-computers, each said cell-computer being connected with at least one said data-token module and the cell-computers being connected by a cell-computer bus.

14. The parallel processing module recited in claim 13, wherein said cell-computer, data-token control module, and data-token array are integrated into a single card.

15. The parallel processing module recited in claim 13, wherein said computer, cell-computer, data-token control module, and data-token array are integrated into a single chip.

* * * * *